US012731947B2

(12) United States Patent
Xiao et al.

(10) Patent No.: US 12,731,947 B2
(45) Date of Patent: Sep. 8, 2026

(54) SOCKET INTERCONNECT STRUCTURES AND RELATED METHODS

(71) Applicant: Intel Corporation, Santa Clara, CA (US)

(72) Inventors: Kai Xiao, Portland, OR (US); Phil Geng, Washougal, WA (US); Carlos Alberto Lizalde Moreno, Guadalajara (MX); Raul Enriquez Shibayama, Zapopan (MX); Steven A. Klein, Chanlder, AZ (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 17/957,761

(22) Filed: Sep. 30, 2022

(65) Prior Publication Data

US 2024/0113479 A1 Apr. 4, 2024

(51) Int. Cl.

| | |
|---|---|
| ***H01R 13/6597*** | (2011.01) |
| ***H01R 12/71*** | (2011.01) |
| ***H01R 13/50*** | (2006.01) |
| ***H01R 13/6471*** | (2011.01) |
| ***H01R 33/74*** | (2006.01) |

(Continued)

(52) U.S. Cl.

CPC ....... *H01R 13/6597* (2013.01); *H01R 12/714* (2013.01); *H01R 13/50* (2013.01); *H01R 13/6471* (2013.01); *H01R 33/74* (2013.01); *H01R 43/18* (2013.01); *H01R 43/20* (2013.01); *H01R 12/57* (2013.01)

(58) Field of Classification Search

CPC .. H01R 13/6597; H01R 12/714; H01R 13/50; H01R 13/6471; H01R 33/74; H01R 43/18; H01R 43/20; H01R 12/57; H05K 7/1038

See application file for complete search history.

(56) References Cited

U.S. PATENT DOCUMENTS 5,228,864 A * 7/1993 Fusselman ......... H01R 13/6582 439/108

5,261,829 A * 11/1993 Fusselman ......... H01R 13/6585 439/607.06

(Continued)

OTHER PUBLICATIONS

Smith, "Intel's LGA CPU Sockets Explained | Digital Trends," Digitaltrends.com, Mar. 15, 2021, accessed on Jul. 12, 2022, 12 pages.

*Primary Examiner* — Abdullah A Riyami
*Assistant Examiner* — Nader J Alhawamdeh
(74) *Attorney, Agent, or Firm* — Hanley, Flight & Zimmerman, LLC

(57) ABSTRACT

Methods, apparatus, systems, and articles of manufacture are disclosed for socket interconnect structures and related methods. An example socket interconnect apparatus includes a housing defining a plurality of first openings and a plurality of second openings and a ground structure coupled to the housing. The ground structure defines a plurality of third openings. The third openings of the ground structure align with the second openings of the housing when the ground structure is coupled to the housing. A plurality of ground pins are located in respective ones of the second openings and third openings. The ground structure is to electrically couple the ground pins. A plurality of signal pins are located in respective ones of the first openings of the housing. The signal pins are electrically isolated from the ground structure.

20 Claims, 20 Drawing Sheets

(51) Int. Cl.

| | |
|---|---|
| ***H01R 43/18*** | (2006.01) |
| ***H01R 43/20*** | (2006.01) |
| *H01R 12/57* | (2011.01) |

(56) References Cited

U.S. PATENT DOCUMENTS

| | | | | |
|---|---|---|---|---|
| 6,016,254 | A | 1/2000 | Pfaff | |
| 7,264,486 | B2 | 9/2007 | Ma | |
| 7,993,145 | B1 | 8/2011 | Howell et al. | |
| 8,739,392 | B2 * | 6/2014 | Byquist | H01L 21/56 29/842 |
| 9,178,328 | B2 | 11/2015 | Heppner et al. | |
| 12,413,001 | B2 | 9/2025 | Zhang et al. | |
| 2003/0119361 | A1 | 6/2003 | Figueroa et al. | |
| 2009/0053914 | A1 * | 2/2009 | Ma | H01R 12/89 439/83 |
| 2010/0136833 | A1 | 6/2010 | Zwanger | |
| 2011/0287671 | A1 | 11/2011 | Ihara | |
| 2011/0294308 | A1 * | 12/2011 | Kuwata | H01R 12/62 439/55 |
| 2015/0280367 | A1 | 10/2015 | Dobrick et al. | |
| 2018/0331035 | A1 * | 11/2018 | Zhang | H01L 24/81 |
| 2020/0328558 | A1 | 10/2020 | Kasar et al. | |
| 2020/0350716 | A1 * | 11/2020 | Narumi | G01R 1/07314 |
| 2021/0272892 | A1 * | 9/2021 | Zhang | H01L 25/0657 |
| 2022/0115820 | A1 * | 4/2022 | Lin | H01R 13/6594 |
| 2024/0113479 | A1 * | 4/2024 | Xiao | H01R 33/74 |

* cited by examiner

SOCKET INTERCONNECT STRUCTURES AND RELATED METHODS

FIELD OF THE DISCLOSURE

This disclosure relates generally to electronic devices and, more particularly, to socket interconnect structures and related methods.

BACKGROUND

A central processing unit (CPU) socket or CPU slot is a mechanical component that provides mechanical and electrical connections between a microprocessor and a printed circuit board (PCB). Sockets allow the CPU to be replaced without soldering.

Figure 1:
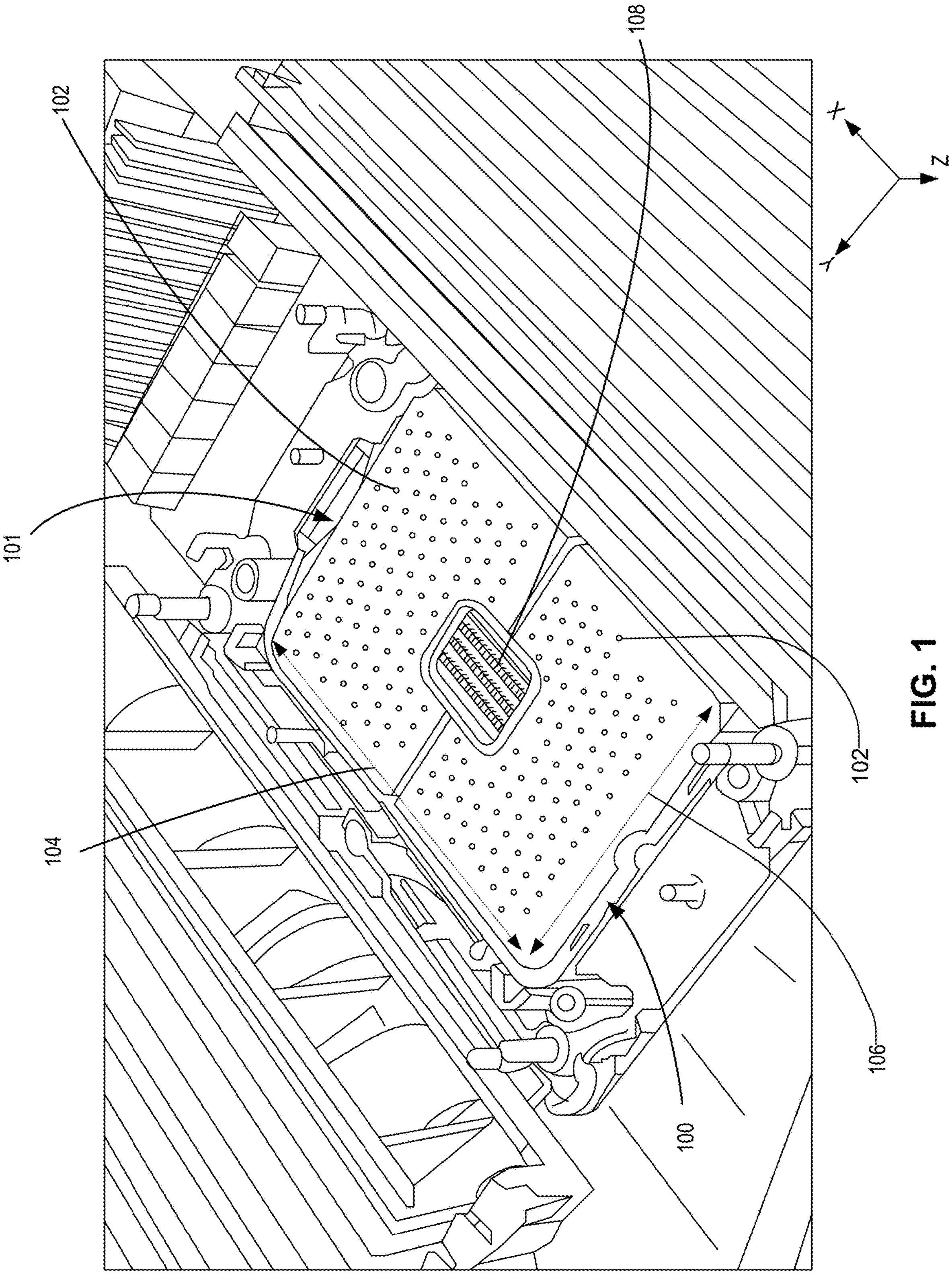
FIG. 1 is an example electronic device including an example socket in accordance with teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

There is an ever-growing demand for increases in electrical bandwidth and/or signaling speeds (e.g., input/output speeds) of electronical components. For example, such increase in signaling speeds requires interconnect components of higher or faster bandwidth. For example, sockets (e.g., a land grid array (LGA) sockets, a ball grid array (BGA) socket, a pin grid array (PGA) socket, double-compression socket, etc.) are interconnect components that are employed to couple a central processing unit (CPU) or other semiconductor package (e.g., GPU, memory, etc.) and a motherboard. A typical central processing unit (CPU) socket includes a large array of individual contacts (e.g., pins) that provide electrical connections (e.g., power, signal nets, ground, etc.) between a CPU socket package and a mother board. If a CPU is connected via a CPU socket, the CPU is not soldered and can therefore be removed from the motherboard and/or replaced.

Higher signaling speeds require channels of higher bandwidth. As such, socket interconnect components of higher bandwidth are needed. However, increasing electrical bandwidth of a socket device is challenging because increasing electrical bandwidth results in an increased resonance frequency. Resonance frequencies can interfere (e.g., interrupt) signals being transferred via the socket component. For example, in signal processing, a Nyquist frequency is a frequency value that is one-half of a sampling rate (e.g., samples per second). When a highest frequency (bandwidth) of a signal is less than a Nyquist frequency of a sample, the resulting discrete-time sequence is free of distortion.

Thus, to avoid signal interference at a component level, resonance free frequencies can be up to two times a Nyquist frequency of the signal. For example, Peripheral Component Interconnect Express (PCIe) technology (e.g., PCIe 6.0) operates at frequencies between approximately twenty gigahertz (GHz) and thirty gigahertz (GHz). Providing socket devices that meet PCIe 6.0 electrical requirements (e.g., 64 gigabytes/second (Gbps) PAM4 modulation technique), while being resonance free up to 32 Gbps, is challenging. Next generation PCIe can operate at 128 Gbps in PAM4, which indicates a need for a resonance-free frequency range between approximately 50 GHz and 64 GHz.

Resonance frequencies of an interconnect component are dependent on the geometry and/or structure of the socket. For example, expanding the electrical bandwidth of the socket by shifting geometry-related resonances to higher frequencies can increase the input/output speed of the corresponding computing apparatus mounted in the socket.

In some sockets, dominant resonances are related to geometries of an individual pin and/or an arrangement of the pins that form a pin array. For instance, a geometry of the pins, a number of pins, an overall height of the pins, a pitch between pins, etc., can increase or decrease bandwidth capabilities of the socket. In addition, the overall height of the socket can also increase or decrease bandwidth capabilities of the socket. However, increasing the electrical bandwidth by modifying a geometry of the pins and/or the socket device is challenging due to manufacturing and/or mechanical limitations. Such manufacturing and/or mechanical limitations can significantly increase manufacturing costs of a socket device (e.g., by more than 30 percent).

For example, as an overall height of a pin (e.g., an interconnect for a socket) decreases, the overall height of the socket also decreases. The decreased height of socket decreases the working range or capability to absorb stack warpage. For instance, increasing an area of the socket device (e.g., a length and a width in an x-y plane or direction) while maintaining the same thickness or height (e.g., in a z-direction, a stack-up thickness in a vertical direction) reduces a mechanical strength of the socket device, making it more susceptible to warpage. As used herein, the x-direction and the y-direction are in a same plane (e.g., a horizontal plane), and the z-direction is in a plane (e.g., a vertical plane) perpendicular to the x-y plane. In some such examples, heat generated by circuitry can cause a circuit board to warp, thereby reducing performance. In some instances, as a thickness (e.g., in the z-direction, a height, etc.) of a pin decreases, a thickness (e.g., in the same z-direction, a height etc.) of a plastic housing supporting and/or surrounding the pin decreases. Decreasing of the plastic housing thickness can limit an ability of the plastic housing to retain a pin (e.g., metal interconnect).

In some examples, decreasing a pitch between the pins (e.g., a distance between the pins) can increase a risk of a short circuit between the pins. Decreasing a pitch of the pins also presents a manufacturing risk of having a small web of plastic form between the pins, which can cause a short circuit. Additionally, decreasing the pitch between the pins also decreases electrical shielding for signal pins. As the electrical shielding decreases, the signals communicated by the pins may overlap thereby degrading performance of the socket.

Additionally or alternatively, reducing a height of the pins can shift resonance frequencies to higher ranges. For example, a physical height of the pins influences a speed of the socket because there is less of an electrical distance for a signal to travel through pins having a smaller height compared to pins having a larger height (e.g., standard pins). However, decreasing a height of the pins reduces the ability of the pins to deflect in a vertical direction when coupling to a motherboard or a package. Thus, reduction in pin height can cause mechanical challenges making it difficult to apply a sufficient load to make contact between the pins and respective pads of a motherboard and/or package. In some instances, a smaller height socket can restrict a form factor of land-side capacitors, limiting a decoupling capacity and/or increasing manufacturing costs. For example, land-side capacitors need to be a certain height to function (e.g., carry a charge, discharge a charge). As the height of the pins decreases, a height of the land-side capacitors must also decrease, which increases the costs of manufacturing land-side capacitors able to hold the same charge as capacitors associated with taller pins.

Examples disclosed herein provide a cost-effective alternative approach for enabling sockets to support higher speed and higher bandwidth for high speed input/output components. Specifically, example sockets disclosed herein employ a ground structure to ground two or more pins of the socket. In particular, example ground structures disclosed herein provide a common ground for a plurality of grounding pins (e.g., a subset of ground pins) surrounding signal pins that carry signals (e.g., differential pins, differential signal pins, high-speed pins). To improve bandwidth, example sockets disclosed herein employ a ground structure positioned between respective ends (e.g., between respective upper and lower ends) of the pins to achieve electrical characteristics associated with shortening the pins without actually making the pins physically shorter. In other words, a height of the pins is not mechanically or physically shortened but the pins nonetheless exhibit behavior from an electrical signal standpoint that would be present had shorter pins been employed (e.g., the ground structure is positioned to reduce the electrical path along the pins to less than the full length of the pins). While the height of the pins is not actually or physically shortened, example ground structures disclosed herein effectively improve electrical characteristics of the pins as if the pins where shortened. As a result, example ground structures disclosed herein enable a physical characteristic or height of the pins to provide mechanical advantages (e.g., loading advantages) while providing electrical advantages by improving bandwidth capabilities of the sockets.

Example ground structures disclosed herein enable ground pins of a socket to be electrically connected in a selected area of the pin array and/or socket. In some examples, a subset of pins is electrically connected via example ground structures disclosed herein to provide a mesh of ground pins in a socket. For example, example ground structures disclosed herein are provided in a socket between a first end of the pins that engage an integrated circuit (IC) package and a second end of the pins opposite the first end that engage a motherboard or printed circuit board. In some examples, ground structures disclosed herein can be configured to electrically couple all ground pins surrounding a differential pin pair area. In some examples, ground structures disclosed herein can be structured to group the ground pins into a plurality of subsets and electrically couple only the ground pins associated with a given subset. In other words, example ground structures disclosed herein can electrically couple subsets of ground pins, where a first group of ground pins associated with a first subset of ground pins are electrically decoupled from (e.g., not electrically coupled with) a second group of ground pins associated with a second subset of ground pins. Each of the corresponding subsets can be positioned and/or associated with a differential signal pair to reduce crosstalk between the signal pins of the differential signal pair.

Examples disclosed herein can increase a bandwidth of a socket by more than 35% without changing a geometry or array of a contact design (e.g., without employing shorter pins or a shorter pin array). In other words, examples disclosed herein improve bandwidth by shifting resonance frequencies higher without requiring geometric changes to pins and/or a pin array (e.g., pitch, number of pins, etc.) of a socket. For example, absent ground structures disclosed herein, a socket (e.g., a socket-E pin) having inherent resonance of approximately twenty-two GHz will exhibit a reduced bandwidth. In contrast, a socket (e.g., a socket-E pin) employing example ground structures disclosed herein can provide inherent resonance of approximately thirty GHz, which is approximately a thirty-four percent to thirty-six percent improvement over the prior approach. In some examples, ground structures disclosed herein can provide a socket that is resonance free between fifty GHz and sixty-four GHz.

FIG. 1 is an example electronic device including an example socket 100 constructed in accordance with teachings of this disclosure. Referring to FIGS. 1, the socket 100 of the illustrated example includes an array 101 of individual contacts 102 (e.g., conductive or copper contacts, copper pins, etc.). As used herein, the contacts 102 may be signal pins 202 (FIG. 2) and/or ground pins 204 (FIG. 2). The socket 100 of the illustrated example interconnects or couples a central processing unit (CPU) or semiconductor package (e.g., a semiconductor package 508 such as that shown below in FIG. 5) and a printed circuit board (PCB) (e.g., a printed circuit board 510 such as that shown below in FIG. 5, a motherboard, substrate package, etc.). The array 101 of individual contacts 102 (e.g., the pins) provide electrical connections (e.g., to support power, signals, etc.) between the semiconductor package 508 and the printed circuit board 510. The socket 100 of the illustrated example enables connection between the semiconductor package 508 and the printed circuit board 510 without soldering, which enables the semiconductor package 508 to be easily removed from the printed circuit board 510 (e.g., motherboard).

The array 101 of contacts 102 of the illustrated example forms a grid-like pattern (e.g., a rectangular pattern). The socket 100 of the illustrated example has a length 104 along a first axis (e.g., an x-axis), a width 106 along a second axis (e.g., a y-axis), and a thickness or height 108 along a third axis (e.g., a z-axis). In some examples, the length 104 is approximately one hundred millimeters, the width 106 is approximately seventy millimeters, and the height 108 is approximately twenty millimeters. Other dimensions are likewise possible to suit desired applications. The socket 100 of the illustrated example exhibits between approximately sixty thousand and approximately eighty thousand contacts 102. In some examples, the socket 100 of the illustrated example has seventy thousand contacts 102.

The example socket 100 of the illustrated example is a land grid array (LGA) socket. However, in other examples, ground structures disclosed herein are implemented with a ball grid array (BGA) socket, double-compression socket, a zero insertion force (ZIF) socket, Plastic Pin Grid Array (PPGA) socket, staggered pin grid array (SPGA) socket, pin grid array (PGA) socket, and/or any other example socket (s).

Figure 2A:
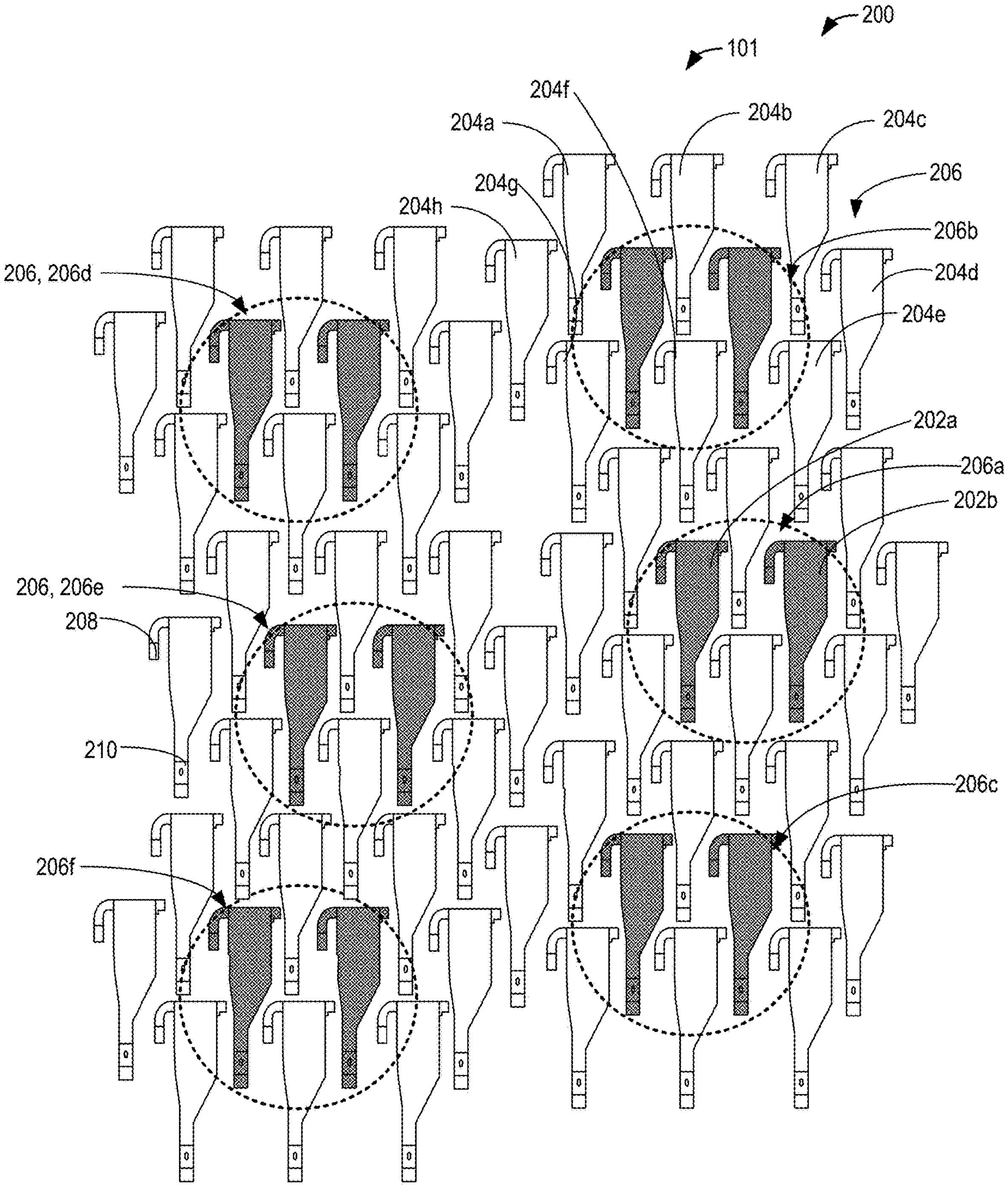
FIG. 2A is a top perspective view of an example array of the example socket of FIG. 1.
Figure 2B:
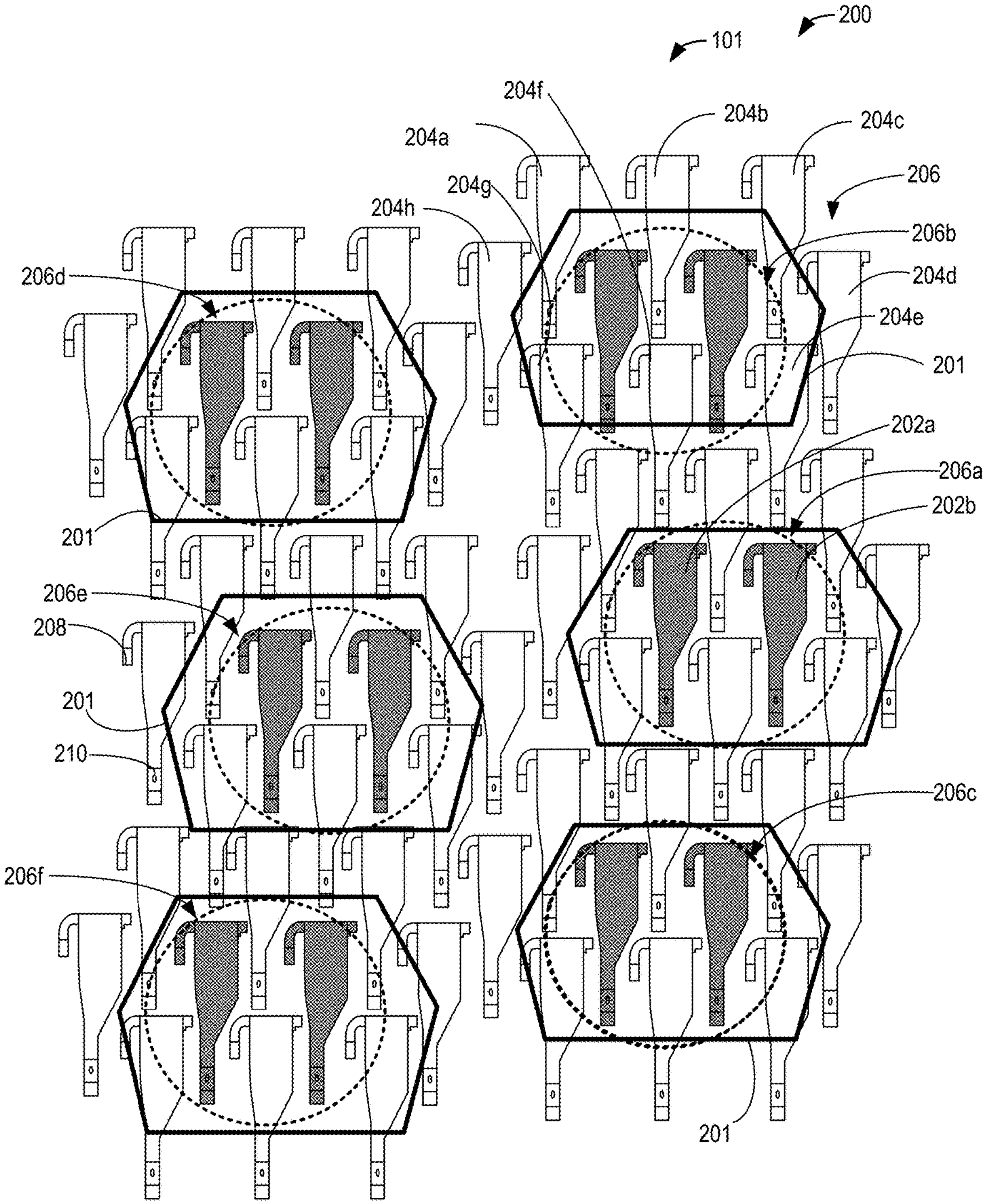
FIG. 2B is a top perspective view of the example array of FIG. 2A shown with an example ground structure.

FIG. 2A is a top perspective view of a portion 200 of the example array 101 of the example socket 100 of FIG. 1. FIG. 2B is a top perspective view of the example array 101 of the example socket 100 of FIG. 1 having an example ground structure 201 disclosed herein. The array 101 of the illustrated example includes signal pins 202 and ground pins 204. For clarity and convenience, the signals pins 202 of the illustrated example are shaded and the ground pins 204 are unshaded. As used herein, signal pins 202 are defined to be pins intended for carrying electrical signals and/or power. As shown in FIGS. 2A-2B, each of the signal pins 202 and ground pins 204 include an example protruding portion 208 and an example base portion 210. In this example, the protruding portion 208 extends away from the base portion 210 in a direction upwards and laterally relative to the base portion 210. FIGS. 3B and/or 5 are side views of example angles of protrusion of the protruding portion 208. The tips or ends of the protruding portions 208 of the signal pins 202 are positioned to interface (e.g., electrical couple) with corresponding contacts (e.g., lands) on an interfacing IC package. The signal pins 202 of the illustrated example include a plurality of differential pairs 206. Each of the differential pairs 206 include a first signal pin 202*a* and a second signal pin 202*b*. In the example of FIGS. 2A-2B, there are six differential pairs 206*a-f*. For example, in the illustrated example, a first differential pair 206*a* is between a second differential pair 206*b* and a third differential pair 206*c*. The example of FIGS. 2A-2B includes an example fourth differential pair 206*d*, an example fifth differential pair 206*e*, and an example sixth differential pair 206*f*. However, in other examples, the socket 100 of the illustrated example can have more than six differential pairs 206 or less than six differential pairs 206.

The differential pairs 206*a-c* are positioned in a first column in the orientation of FIGS. 2A-B, and the differential pairs 206*d-f* are positioned in a second column adjacent the first column in the orientation of FIGS. 2A-B. Each of the differential pairs 206 of the illustrated example are surrounded by a group or subset of the ground pins 204. For example, a first ground pin 204*a*, a second ground pin 204*b*, a third ground pin 204*c*, a fourth ground pin 204*d*, a fifth ground pin 204*e*, a sixth ground pin 204*f*, a seventh ground pin 204*g*, and an eighth ground pin 204*h* surround the second differential pair 206*b*. As described in greater detail below in connection with FIGS. 3A-3C, the ground pins 204 of each subset are electrically connected together via respective ones of the ground structures 201 (FIG. 2B). Each subset disclosed herein can include two or more ground pins 204 associated with a pair 206 of signal pins 202. However, adjacent subsets of the ground pins 204 are not electrically coupled. For example, each subset of the ground pins 204 is electrically isolated from each other. In the example of FIG. 2B, the ground structure 201 is a conductive wire or conductive trace. However, in other examples, the ground structure 201 can be a plate and/or any other conductive structure.

Figure 2C:
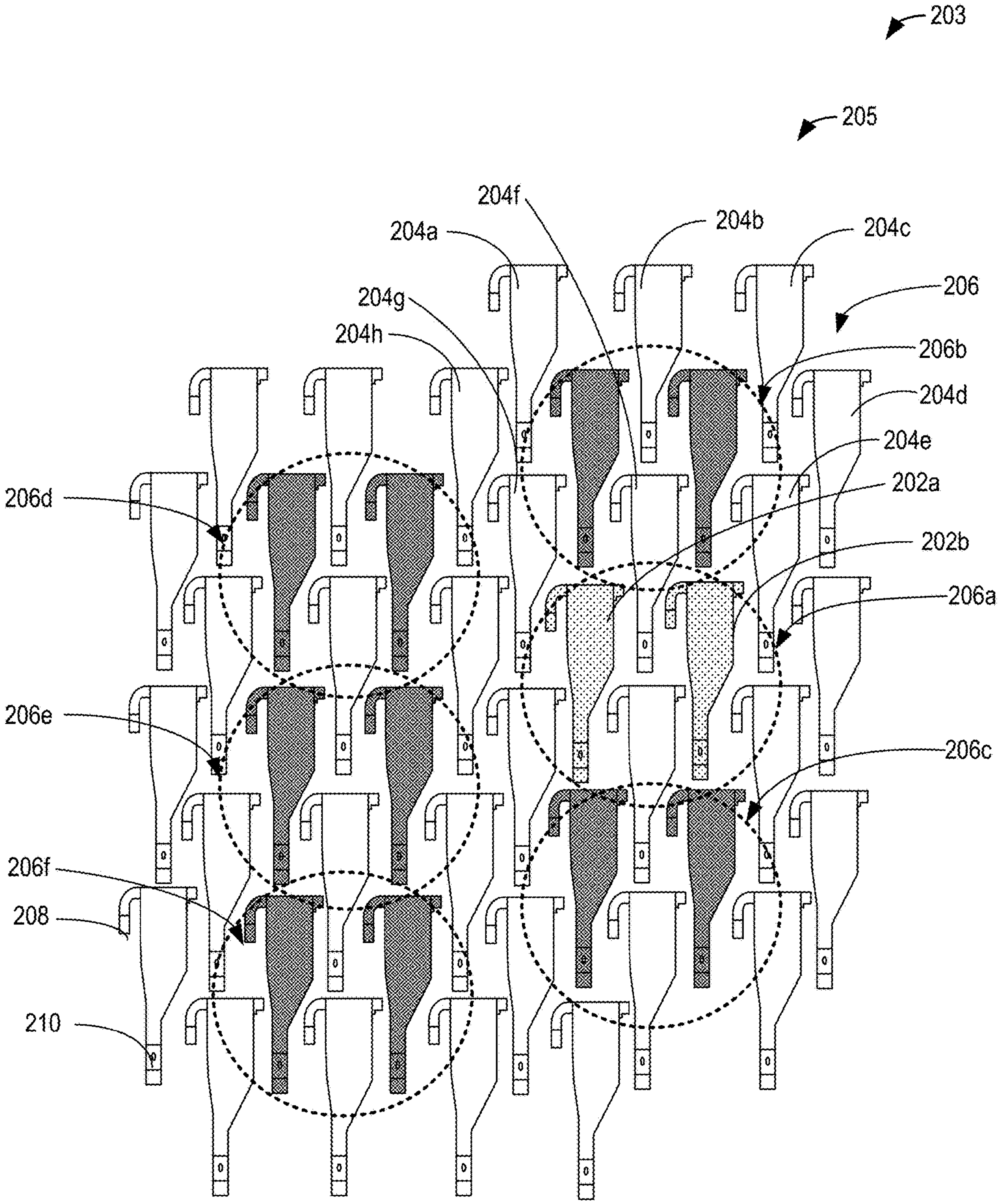
FIG. 2C is a top perspective view of another example array disclosed herein that can implement the example socket of FIG. 1.
Figure 2D:
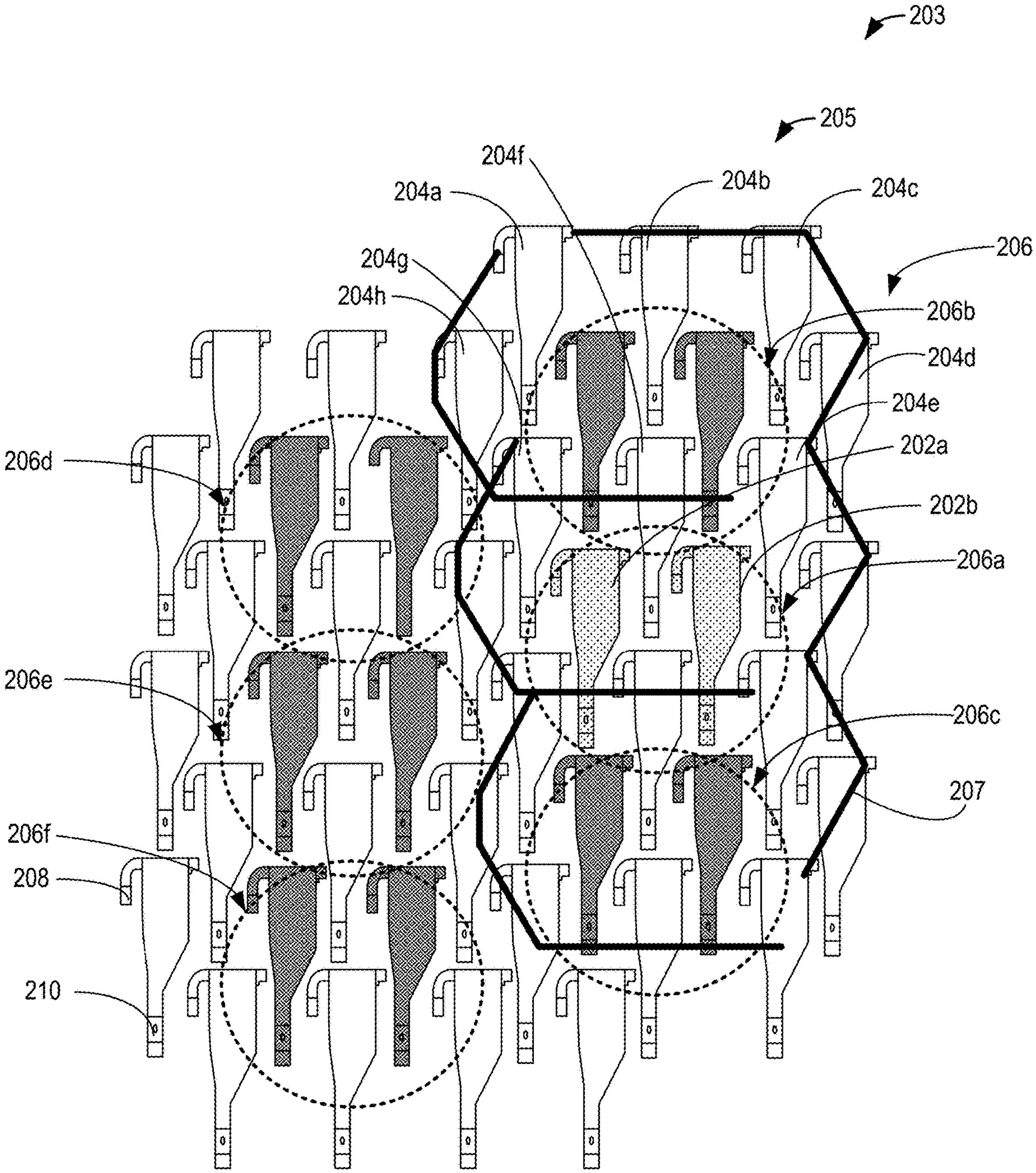
FIG. 2D is a top perspective view of the example array of FIG. 2C shown with another example ground structure.

FIG. 2C is a top perspective view of another example portion 203 of an example array 205 that can implement an example socket such as the socket 100 of FIG. 1. FIG. 2D is a top perspective view of the example portion 203 of the array 205 shown with another example ground structure 207 disclosed herein. The ground structure 207 of FIG. 2C and FIG. 2D interconnects and/or couples the ground pins 204 that are associated with the different signal pins 202. In other words, the ground structure 207 of FIG. 2D interconnects (e.g., daisy-chains) different subsets (e.g., a plurality of subsets, two or more subsets) of the ground pins 204. As described in greater detail below in connection with FIGS. 3D-3E, two or more subsets of ground pins 204 of the illustrated example are electrically connected together via one or more ground structures 201 (FIG. 2B) of the socket 100. In the example of FIG. 2D, the ground structure 207 is a conductive wire or conductive trace.

The example socket 100 implemented with the example array 101 of FIGS. 2A-2B and/or an example socket implemented with the array 205 of FIGS. 2C-2D can provide approximately a thirty-four percent increase in bandwidth (e.g., seven GHz) or a thirty-six percent increase in bandwidth (e.g., eight GHz). In some examples, example sockets disclosed herein can provide an increase of seven GHz (e.g., corresponding to a decibel measurement take an approximately (−1.5) decibels) and/or eight GHz (e.g., corresponding to a decibel measurement taken at approximately (−6) decibels). Some example sockets disclosed herein may provide more than a thirty-six percent increase in bandwidth. Example sockets (e.g., the socket 100) that includes the array 101 and/or the array 205 disclosed herein can also increase crosstalk performance for the first differential pair 206*a* and the second differential pair 206*b*. When measured between twenty GHz and thirty GHz, the improvement in crosstalk performance is between approximately ten decibels to twenty decibels. In other examples, the improvement in the crosstalk performance may be greater than twenty decibels for a first differential pair 206*a* and a second differential pair 206*b*. When measured for the first differential pair 206*a* and the third differential pair 206*c*, the improvement in crosstalk performance is also between approximately ten decibels to twenty decibels. In other examples, the improvement in the crosstalk performance may be greater than twenty decibels for a crosstalk performance between the first differential pair 206*a* and the third differential pair 206*c*. The array 101 of FIGS. 2A-2B and/or the array 205 of FIGS. 2C-2D can be used, for example, to implement Peripheral Component Interconnect Express (PCIe) technology (e.g., PCIe 6.0).

Figure 3A:
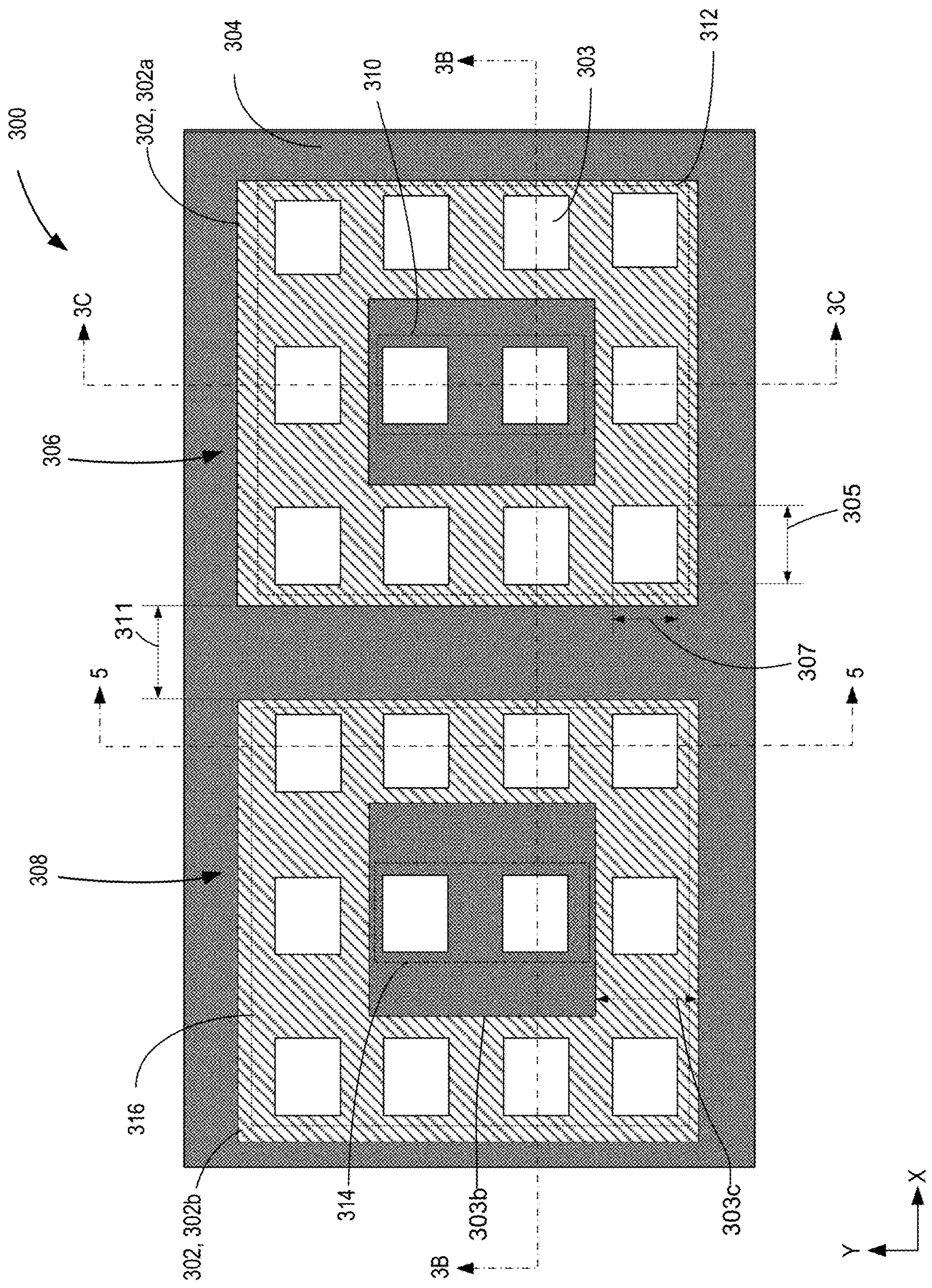
FIG. 3A is a top view of a portion of the example socket of FIG. 1.
Figure 3B:
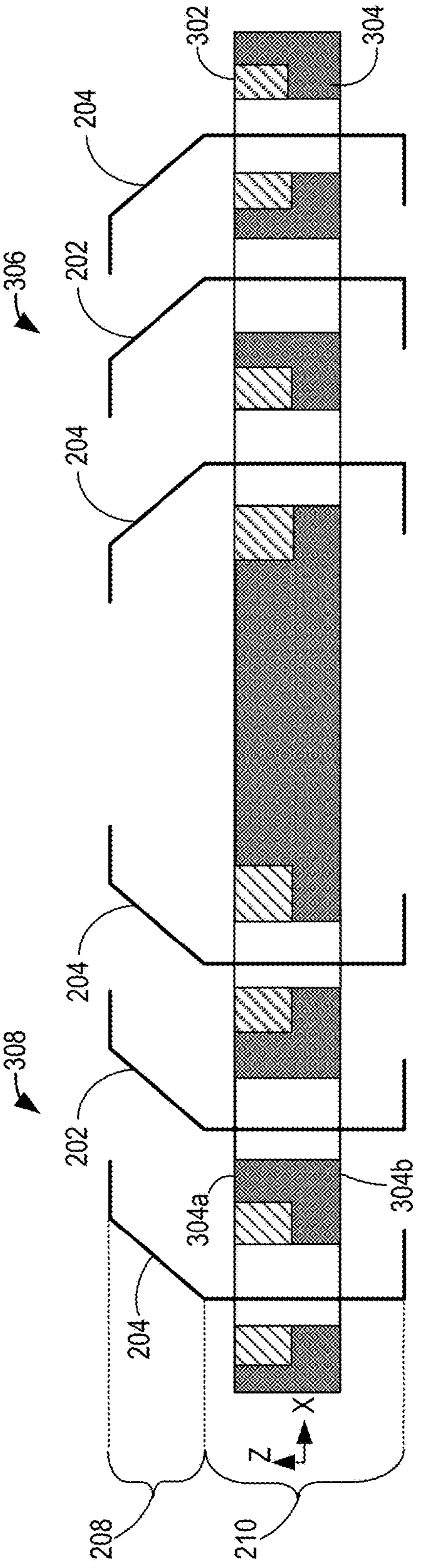
FIG. 3B is a cross-sectional, front view of the example socket of FIG. 3A taken along line 3B-3B of FIG. 3A.
Figure 3C:
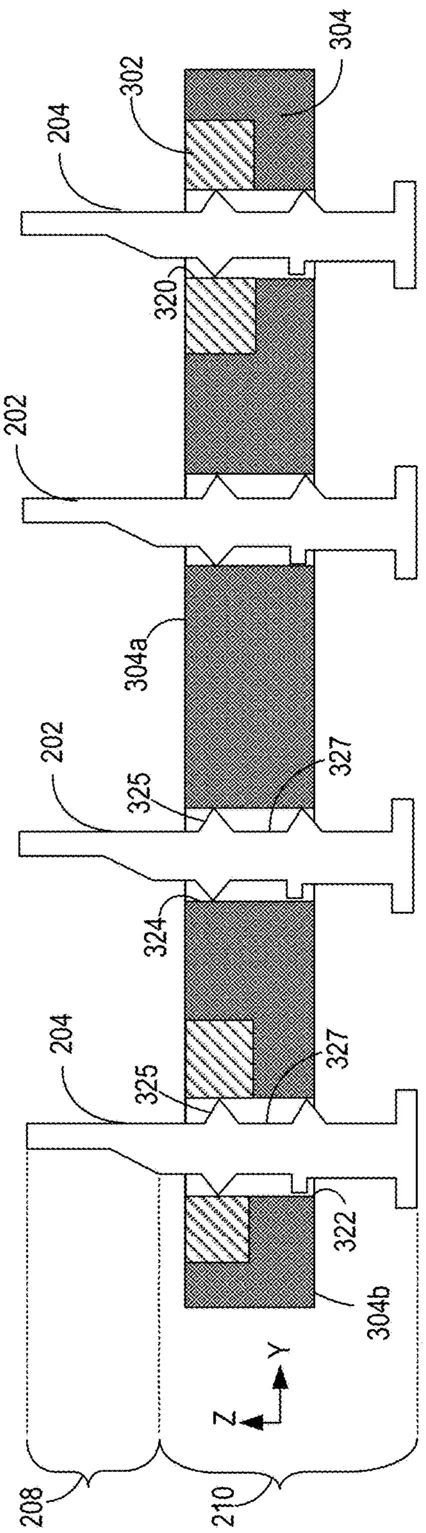
FIG. 3C is a cross-sectional, side view of the example socket of FIG. 3A taken along line 3C-3C of FIG. 3A.

FIGS. 3A-3C is an example implementation of the array 101 of FIGS. 2A-2B. FIG. 3A is a top view of a portion 300 of the example socket 100 of FIG. 1. FIG. 3B is a cross-sectional, front view of the portion 300 taken along line 3B-3B of FIG. 3A. FIG. 3C is a cross-sectional, side view of the portion 300 taken along line 3C-3C of FIG. 3A.

Referring to FIGS. 3A-3C, the socket 100 of the illustrated example includes a ground structure 302 and a housing 304. The ground structure 302 of the illustrated example is coupled with the housing 304. For example, the ground structure 302 is positioned between a first surface 304*a* (e.g., a first end) of the housing 304 and a second surface 304*b* (e.g., a second end) of the housing 304 opposite the first surface 304*a* (e.g., in the z-direction). For example, the ground structure 302 is coupled, attached, fastened, embedded and/or otherwise connected to and/or formed with the housing 304. In some examples, the ground structure 302 is made of an electrically conductive material (e.g., copper). In some examples, the housing 304 is made of an electrically insulating material (e.g., plastic).

The socket 100 (e.g., the ground structure 302 and the housing 304) includes a plurality of openings 303 (e.g., apertures) to receive respective ones of the contacts 102 of the array 101 of FIG. 1. More particularly, in some examples, the base portions 210 of the pins 202, 204 extend through the openings 303 while the protruding portions 208 of the pins 202, 204 protrude above the first surface 304*a* of the housing 304. The signal pins 202 and the ground pins 204 are not shown in FIG. 3A for clarity purposes. The ground structure 302 of the illustrated example includes a body 303*a* that has a rectangular or square shape or perimeter that includes the openings 303 and a central void or opening 303*b* (e.g., a square or rectangular shaped opening).

The body 303*a* of the illustrated example has a width 303*c* along the perimeter. The width 303*c* of the illustrated example is uniform or equal along the perimeter of the ground structure 302. However, in some examples, the width 303*c* can vary along the perimeter and/or the body 303*a* can have any other suitable shape.

The openings 303 of the illustrated example have a first dimension 305 (e.g., a first length) and a second dimension 307 (e.g., a second length). The openings 303 of the illustrated example have a square shape or profile. In other words, the first dimension 305 is substantially similar to (e.g., equal to or within a tolerance of 5%-10%) the second dimension 307. However, in other examples, the openings 303 can have a rectangular shape, a circular or cylindrical shape, an oblong shape, and/or any other shape. The openings 303 extend (e.g. entirely) through the socket 100 (e.g., in the z-direction in the orientation of FIG. 3B and FIG. 3C) between the first surface 304*a* of the socket 100 and the second surface 304*b* of the socket 100 opposite the first surface 304*a*.

In particular, the housing 304 of the illustrated example defines a plurality of first openings 320 (e.g., housing signal pin openings) and a plurality of second openings 322 (e.g., housing ground pin openings). The ground structure 302 of the illustrated example includes a plurality of third openings 324 (e.g., ground structure ground pin openings). When the ground structure 302 is coupled to the housing 304, the third openings 324 of the ground structure 302 align (e.g., coaxially and/or concentrically align) with the second openings 322 of the housing 304. The plurality of ground pins 204 are located in (e.g., the openings 303 defined by) respective ones of the second openings 322 and the third openings 324. The signal pins 202 (e.g., the differential pairs) are located in (e.g., the openings 303 defined by) respective ones of the first openings 320 of the housing 304. The signal pins 202 are electrically isolated or insulated from the ground structure 302 when the signal pins 202 are positioned in the respective ones of the first openings 320 of the housing 304. In other words, the signal pins 202 do not engage and/or are spaced away from the ground structure 302.

In general, the ground pins 204 of the illustrated example electrically isolate the signal pins 202 to reduce crosstalk interference between the signal pins 202. In the illustrated example, the portion 300 of the socket 100 of FIG. 3 includes a first subset 306 of the contacts 102 of FIG. 1 and a second subset 308 of the contacts 102 of FIG. 1. Specifically, the subsets 306, 308 of the illustrated example includes signal pins 202 and surrounding ground pins 204. In particular, the first subset 306 of the illustrated example includes a first differential pair 310 (e.g., the second differential pair 206*b* of FIG. 2) of the signal pins 202 surrounded by a first group 312 of the ground pins 204 (e.g., the ground pins 204*a*, 204*b*, 204*c*, 204*d*, 204*e*, 204*f*, 204*g*, and 204*h* of FIG. 2). The second subset 308 of the illustrated example includes a second differential pair 314 (e.g., the second differential pair 206*b* of FIG. 2) of the signal pins 202 surrounded by a second group 316 of the ground pins 204. In the illustrated example, the first group 312 of the ground pins 204 provide electrical shielding for the first differential pair 310 of the signal pins 202. Likewise, the second group 316 of the ground pins 204 provide electrical shielding for the second differential pair 314 of the signal pins 202. Thus, the first group 312 of the ground pins 204 reduces crosstalk interference for the first differential pair 310 of the signal pins 202. The second group 316 of the ground pins 204 reduces crosstalk interference for the second differential pair 314 of the signal pins 202.

To provide shielding to the first differential pair 310, the ground structure 302 of the illustrated example includes a first portion 302*a* (e.g., a first ground structure) to electrically couple the ground pins 204 of the first group 312 of the ground pins 204 when located in respective ones of the second openings 322 and the third openings 324 of the first portion 302*a*. Similarly, to provide shielding to the second differential pair 314, the ground structure 302 of the illustrated example includes a second portion 302*b* (e.g., a second ground structure) to electrically couple the ground pins 204 of second group 316 when located in respective ones of the second openings 322 and the third openings 324 of the second portion 302*b*. Thus, in the illustrated example, the first group 312 of the ground pins 204 are electrically coupled via a first portion 302*a* of the ground structure 302 and the second group 316 of the ground pins 204 are electrically coupled via a second portion 302*b* of the ground structure 302. Further, as shown in this example, the first and second portions 302*a*, 302*b* of the ground structure 302 extend completely (e.g., continuously) around the corresponding different pairs 310, 314 of the signal pins 202. Thus, the first portion 302*a* of ground pins 204 completely surrounds the first differential pair 310. The second portion 302*b* of ground pins 204 completely surrounds the second differential pair 314.

Additionally, the first group 312 of the ground pins 204 are not electrically coupled to the second group 316 of the ground pins 204. Thus, the first group 312 of the ground pins 204 are electrically decoupled from the second group of the ground pins 204. To electrically decouple the first group 312 and the second group 316 of ground pins 204, the first portion 302*a* is spaced from the second portion 302*b* by a distance 311 (e.g., a separation or space). The housing 304 provides an electrical shield or insulation between the first portion 302*a* of the ground structure 302 and the second portion 302*b* of the ground structure 302. In other words, the first portion 302*a* of the ground structure 302 of the illustrated example is separate from (e.g., decoupled or disconnected from) the second portion 302*b* of the ground structure 302. Thus, the housing 304 electrically insulates the first group 312 of ground pins 204 and the second group 316 of the ground pins 204. In some examples, all of the ground pins 204 of the array 101 can be electrically coupled via the ground structure 302. For example, the ground pins 204 of the first subset 306 and the ground pins 204 of the second subset 308 can be electrically coupled (e.g., via one or more traces, structures, and/or other conductive elements formed with the housing 304). The pins 202, 204 of the illustrated example include example protrusions 325 (e.g., teeth, hooks, etc.) that protrude from an example body 327 (e.g., a side wall) of the pins 202, 204 that couple (e.g., embed) with the housing 304 and/or the ground structure 302 to couple the contacts 102 to the ground structure 302 and/or the housing 304. The protrusions 325 that protrude from the body 327 are to protrude from the base portion 210 of the pins 202, 204, while the example of FIG. 3B and FIG. 3C does not include protrusions 325 protruding from the protruding portion 208 of the pins 202, 204.

Figure 3D:
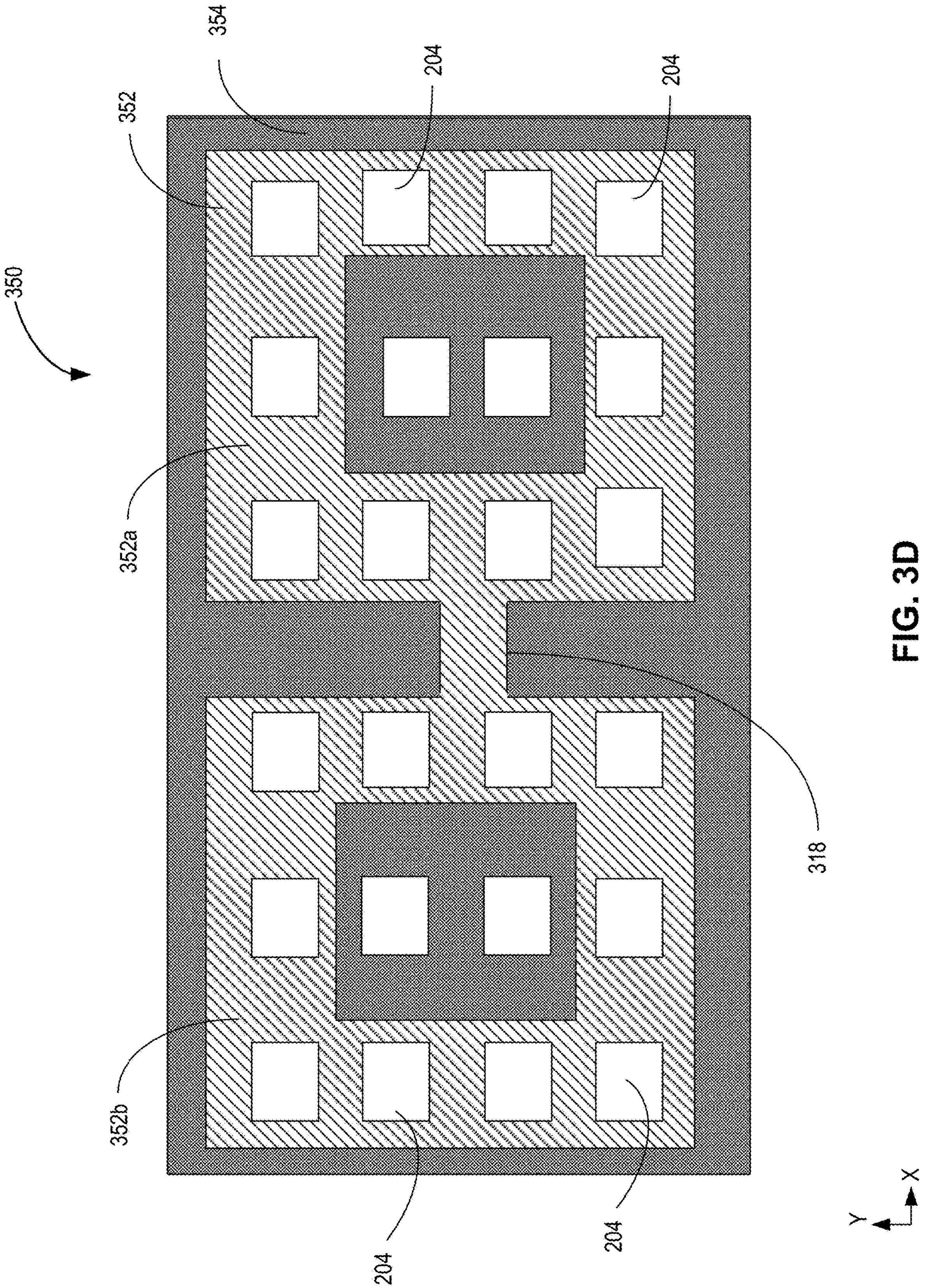
FIG. 3D is a top view of another example portion of another example socket disclosed herein.
Figure 3E:
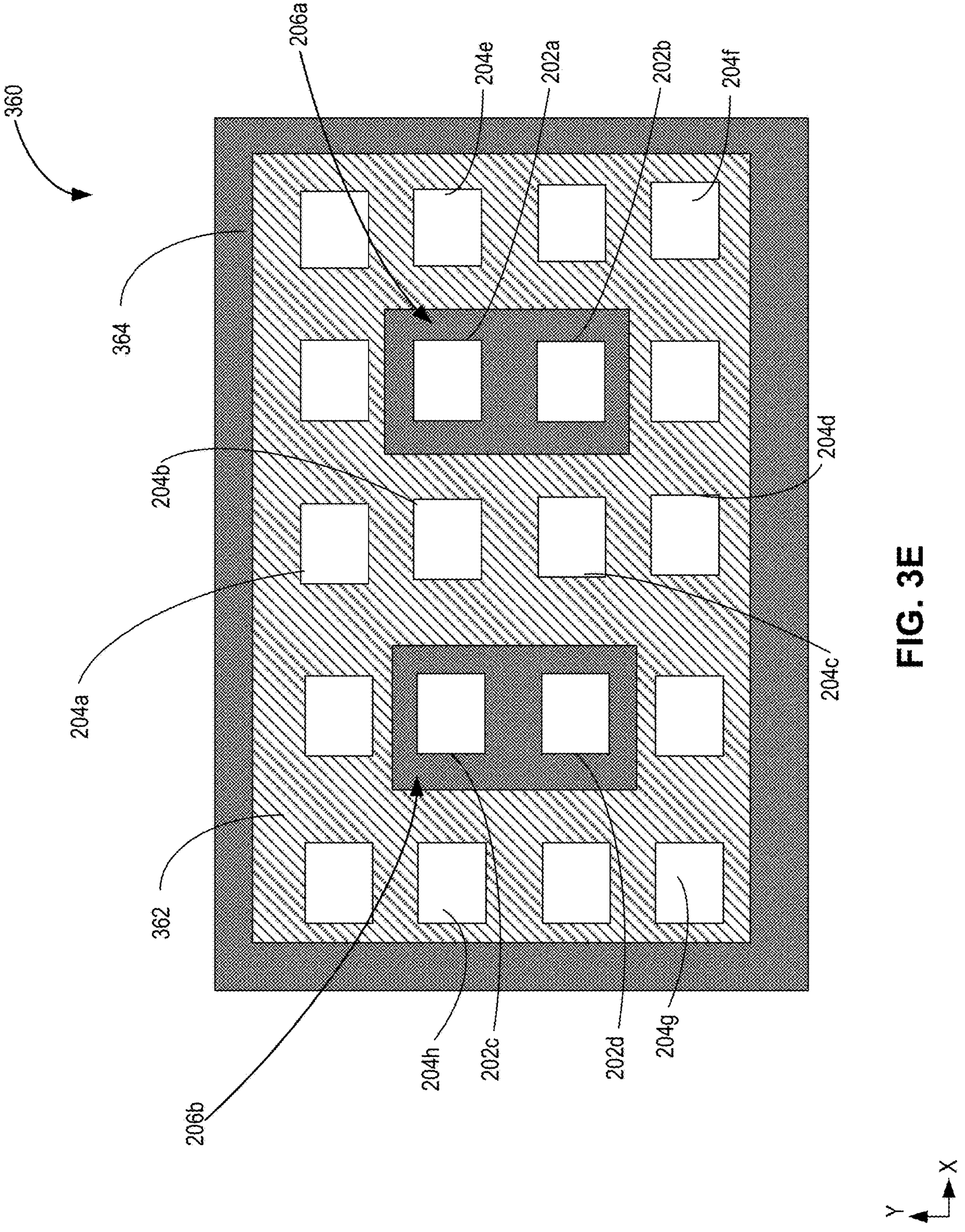
FIG. 3E is a top view of another example portion of another example socket disclosed herein.

FIGS. 3D and 3E are top views of other example sockets 350, 360 disclosed herein that can implement the example array 205 of FIGS. 2C-2D. The example sockets 350, 360 each include a ground structure 352, 362 and a housing 354, 364, respectively, that are substantially similar or identical to the ground structure 302 and the housing 304 of the socket 100 of FIG. 3A-3D.

Referring to FIG. 3D, the example socket 350 includes an example connecting portion 318 to electrically couple a first portion 352*a* of the ground structure 352 and a second portion 352*b* of the ground structure 352. For example, the ground structure 352 can include the connecting portion 318 (e.g., a conductive leg or arm) to electrically couple ground pins 204 of the first portion 352*a* of the ground structure 352 and ground pins 204 of the second portion 352*b* of the ground structure 352. In some examples, all of the ground pins 204 of an array (e.g., the array 205) can be electrically coupled via the ground structure 352.

Referring to FIG. 3E, the ground structure 362 of the example socket 360 electrically couples ground pins 204 that surround a first differential pair 206*a* (e.g., a first signal pin 202*a* and a second signal pin 202*b*) and a second differential pair 206*b* (e.g., a third signal pin 202*c* and a fourth signal pin 202*d*). Thus, the ground pins 204 associated with the first differential pair 206*a* and the ground pins 204 associated with the second differential pair 206*b* are electrically coupled via the ground structure 362. More specifically, the first differential pair 206*a* and the second differential pair 206*b* share one or more grounds pins 204 (e.g., ground pins 204*a*, 204*b*, 204*c*, 204*d*) and/or are at least partially surrounded by the same ground pins 204 (e.g., the ground pins 204*a-d*). In the illustrated example, the ground pins 204*a-d* are positioned between the first differential pair 206*a* and the second differential pair 206*b*.

The ground structures 302, 352, 362 of the illustrated examples are made of an electrically conductive material such as copper, aluminum and/or any other suitable electrically conductive material(s). The housing 304, 354, 364 of the illustrated examples are composed of a non-conductive material such as plastic and/or any other suitable insulating or non-conductive material(s).

Figure 4:
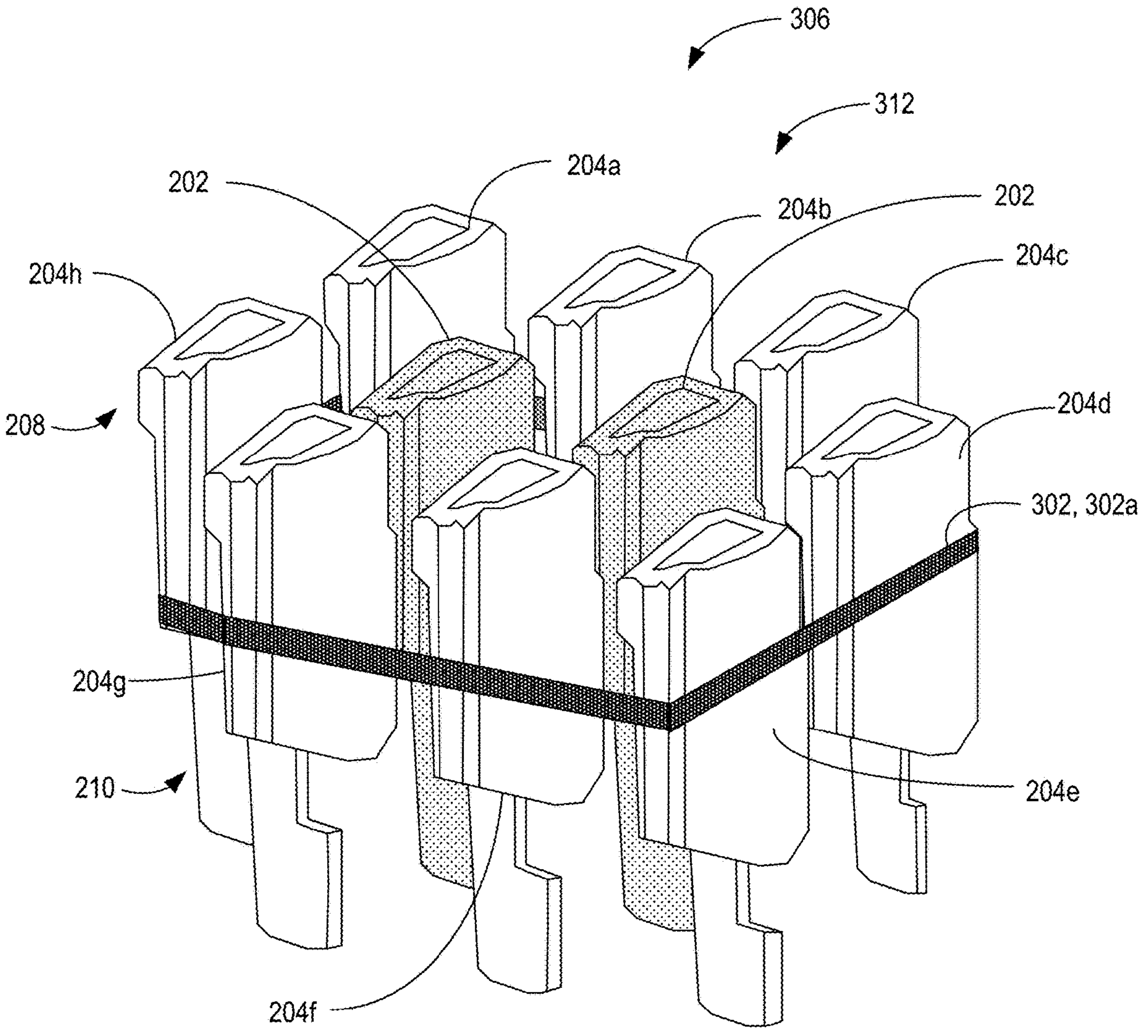
FIG. 4 is a schematic, perspective view of an example first subset of an example array of the example socket of FIG. 3A.

FIG. 4 is a schematic, perspective view of the first subset 306 of FIG. 3A. In FIG. 4, the housing 304 and the protruding portions 208 of the pins 202, 204 are omitted for the sake of clarity. In the illustrated example, the first group 312 of the ground pins 204 are electrically coupled via the first portion 302*a* of the ground structure 302. In the example of FIG. 4, the ground structure 302 is modeled as a conductive wire (e.g., conductive trace). Thus, although the ground pins 204 are spaced apart from each other (i.e., are not physically directly in contact with each other), the ground pins 204 of the first group 312 (e.g., the ground pins 204*a*, 204*b*, 204*c*, 204*d*, 204*e*, 204*f*, 204*g*, and 204*h* of FIG. 2A) are electrically coupled via the ground structure 302.

Figure 5:
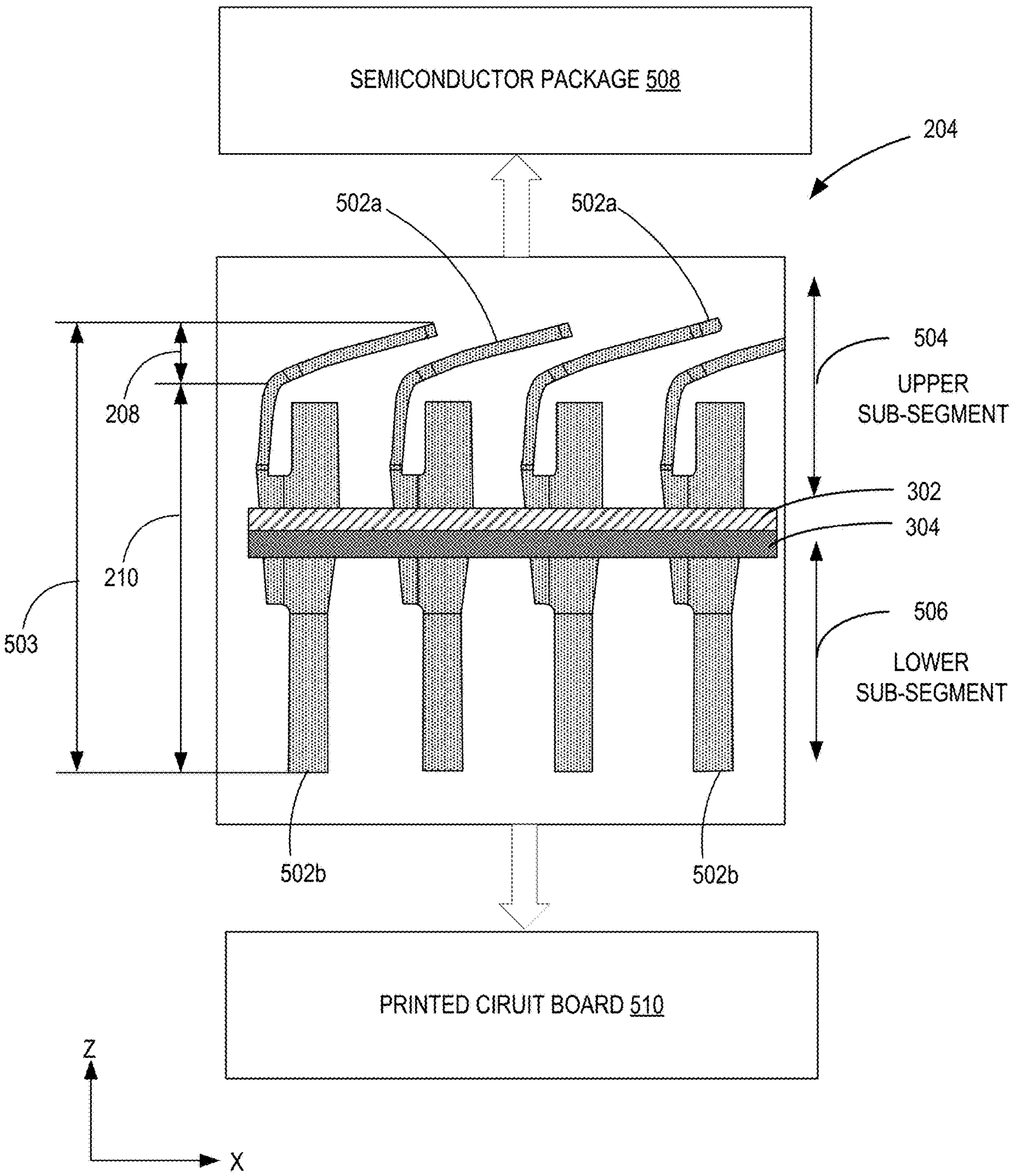
FIG. 5 is a cross-sectional view taken along line 5-5 of FIG. 3A.

FIG. 5 is a cross-sectional view taken along line 5-5 of FIG. 3A. In general, the ground structure 302 of the illustrated example is positioned between respective ends 502*a*, 502*b* of the contacts 102 and/or the ground pins 204. Referring to FIG. 5, the ground structure 302 and the housing 304 of the illustrated example are positioned between a first end 502*a* (associated with the protruding portion 208) of the respective pins 202, 204 and a second end 502*b* (associated with the base portion 210) of the respective pins 202, 204 opposite the first end 502*a*. For example, the ground structure 302 of the illustrated example bifurcates, divides or splits an example overall physical height 503 of the ground pins 204 into a first portion 504 (e.g., an upper segment, oriented toward an example semiconductor package 508) and a second portion 506 (e.g., a bottom segment, oriented toward an example printed circuit board 510, motherboard) (e.g., without physically decreasing the overall physical height 503 of the ground pins 204). For example, the ground structure 302 electrically bifurcates an overall physical length of the ground pins 204. The first portion 504 of one of the ground pins 204 engages (e.g., directly couples or connects to) the semiconductor package 508 and the second portion 506 of the one of the ground pins 204 engages (e.g., directly couples or connects to) the printed circuit board 510 (e.g., PCB, motherboard). In some examples, such as the example of FIG. 5, the ground structure 302 divides the first portion 504 and a second portion 506 at the midpoint between the first portion 504 and the second portion 506 (e.g., the upper segment is equal to the lower segment). For example, the ground structure 302 divides the first portion 504 into a first segment and the second portion 506 into a second segment. In some examples, the first segment is equal to the second segment. In other examples, the first segment is longer than the second segment. In yet other examples, the first segment is shorter than the second segment.

In the illustrated example of FIG. 5, the ground structure 302 is positioned at a midpoint of the overall physical height 503 of the ground pins 204. Thus, in the illustrated example, one of the ground pins 204 is divided approximately in half such that the first portion 504 has a first height and the second portion 506 has a second height substantially equal to the first height. As a result, the ground structure 302 electrically bifurcates or divides each of the ground pins 204 so that the electrical path to be followed to reach the ground structure 302 is approximately half an electrical path that corresponds to the ground pins 204 electrically grounded at one end (e.g., at the second end 502*b*). In some examples, the ground structure 302 can be positioned at any location relative to the overall physical height 503 of one of the ground pins 204. In other words, the ground structure 302 can be positioned at any location in the z-direction (e.g., the vertical direction in the orientation of FIG. 1). The ground structure 302 grounds the ground pins 204 via the socket 100 in contrast with conventional sockets that ground the ground pins 204 via an electrical connection with the semiconductor package 508 and the printed circuit board 510.

In operation, the ground structure 302 electrically divides the ground pins 204 into an upper portion and a lower portion which shortens the time for a response from a return path (e.g., a distance of an electrical path), which increases the resonance frequency. By increasing the resonance frequency, the speed and bandwidth of the socket 100 is increased. The socket 100 of the illustrated example provides a cost-effective approach that can expand the socket bandwidth by at least 35% without changing a design of the contacts 102 (e.g., the overall height 503, pitch, number of contacts 102 of the array 101, etc.). The examples disclosed herein remove the requirement to have more ground pins 204 which limits pin count growth and causes minimum impact to the existing CPU loading solution.

Figure 6:
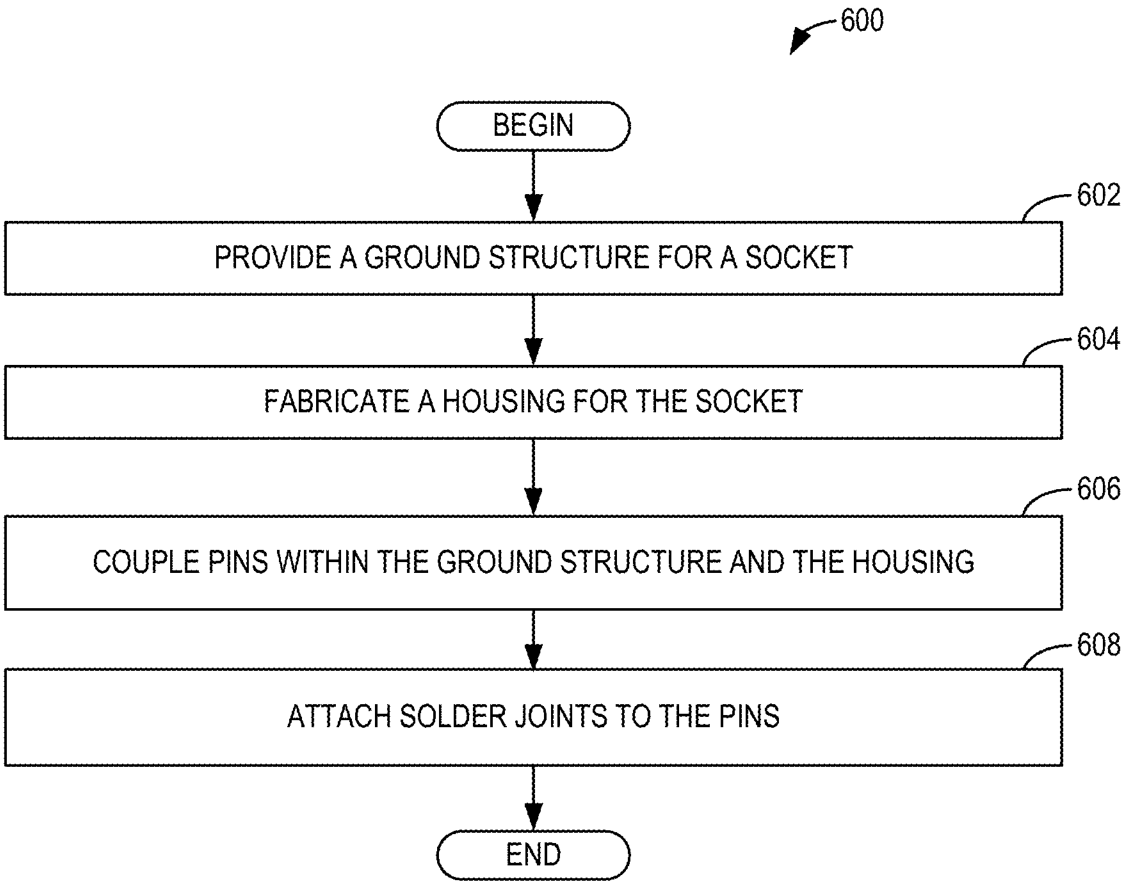
FIG. 6 is a flowchart of an example method of manufacturing an example socket disclosed herein.

FIG. 6 is a flowchart of an example method of manufacturing an example socket disclosed herein. For example, the method 600 of FIG. 6 may be used to fabricate the example socket 100 of FIGS. 1-5. To facilitate discussion of the example method 600, the example method 600 will be described in connection with the socket 100 of FIGS. 1-5. FIGS. 7A-7L depict the example socket 100 of FIG. 1 at various manufacturing stages 701, 703, 705, 707 corresponding to the example method of FIG. 6. FIGS. 7A, 7D, 7G and 7J are example top views 702 (e.g., an x-y plane) of the example socket 100 at the various manufacturing stages 701, 703, 705, 707, respectively. FIGS. 7B, 7E, 7H and 7K are cross-sectional front views 704 (e.g., in a z-x plane) taken along lines A-A of FIGS. 7A, 7D, 7G, and 7J, respectively. FIGS. 7C, 7F, 7I, and 7L are example side views 706 (e.g., a z-y plane) taken along lines B-B of FIGS. 7A, 7D, 7G, and 7J, respectively.

While an example manner of forming the example socket 100 has been illustrated in FIG. 6, one of the steps and/or processes illustrated in FIG. 6 may be combined, divided, re-arranged, omitted, eliminated and/or implemented in any other way. Further still, the example methods of FIG. 6 may include processes and/or steps in addition to, or instead of, those illustrated in FIG. 6 and/or may include more than one of any or all of the illustrated processes and/or steps. Further, although the example methods are described with reference to the flowcharts illustrated in FIG. 6, many other methods or processes of forming electronic packages may alternatively be used.

Referring to the example method 600 of FIG. 6, the method 600 begins by providing a ground structure for a socket (block 602). For example, referring to FIGS. 7A-7C, the ground structure 302 is a conductive plate (e.g., a copper plate) formed via, for example, stamping, machining or any other manufacturing processes. In the illustrated example, the first portion **302*a* (e.g., a first plate) of the ground structure 302 and the second portion 302*b* (e.g., a second plate) of the ground structure 302 are provided. The ground structure 302 includes the third openings 324 to receive the ground pins 204. The ground structure 302 and/or the third openings 324 of the illustrated example can be formed via machining, stamping, drilling, additive manufacturing, a combination thereof, and/or any other suitable manufacturing process(es). For instance, ground structure 302 and the third openings 324 can be formed via stamping. In some examples, the ground structure 302 can be formed via machining and the third openings 324** can be formed via drilling (e.g., a secondary operation).

Figures 7A, 7B, 7C, 7D, 7E, 7F:
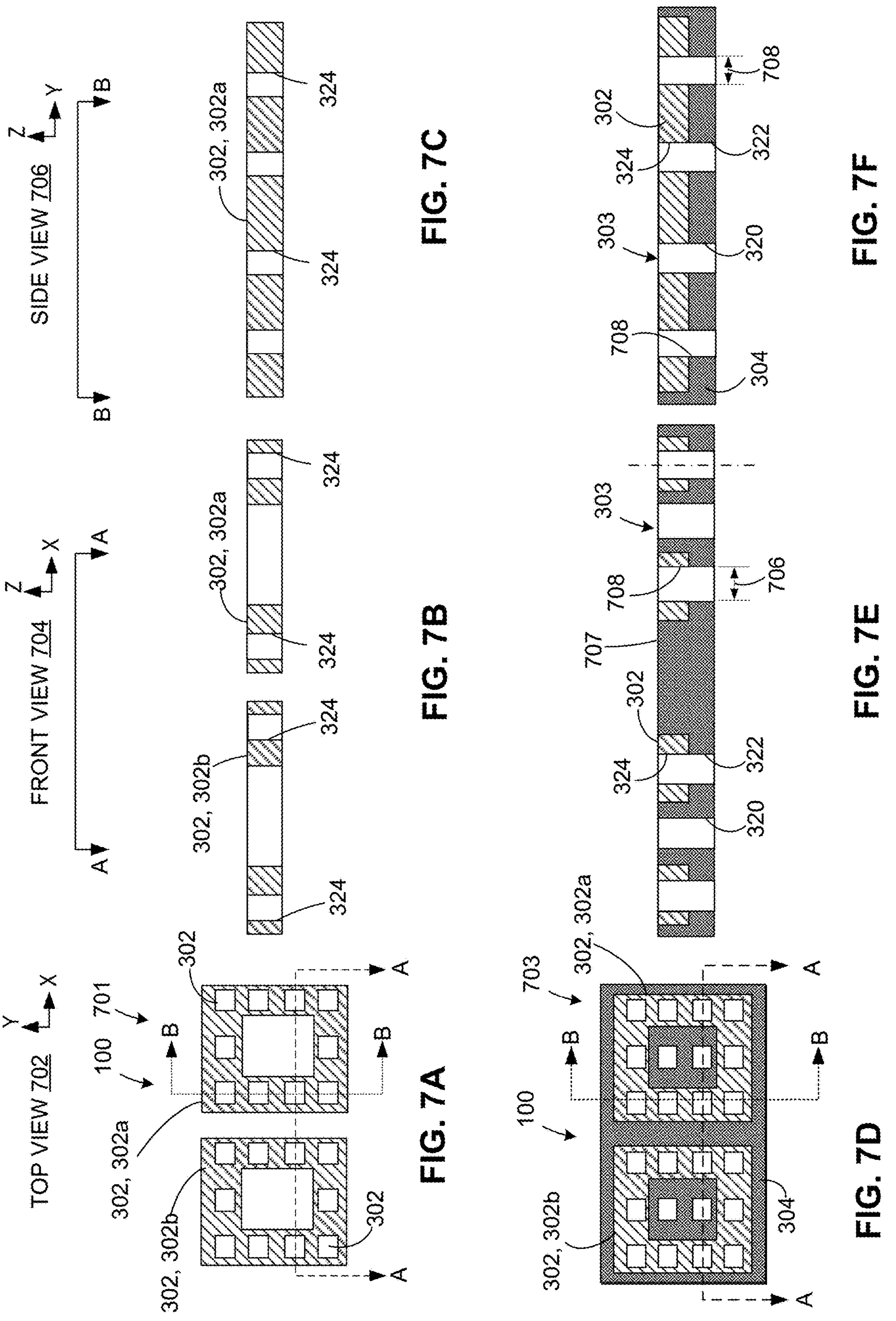
FIG. 7A-7L depict the example socket of FIG. 1 at various manufacturing stages corresponding to the example method of FIG. 6.

Next, a housing of the socket is fabricated to support the ground structure (block 604). For example, the housing can be fabricated with (e.g., provided to) the ground structure via injection-molding. In this manner, the housing is molded with the ground structure. Referring to FIGS. 7D-7F, the housing 304 is an injection-molded housing that is molded with the ground structure 302. For example, the housing 304 is fabricated with the first openings 320 (e.g., signal pin openings, signal openings, etc.) to receive the signal pins 202 and the second openings 322 (e.g., ground pin openings, ground openings, etc.) to receive the ground pins 204. The housing 304 is coupled to (e.g., directly coupled to or integrally formed with) the ground structure 302 via injection molding. When the housing 304 is overmolded with the ground structure 302, the second openings 322 of the housing 304 align (e.g., coaxially and/or concentrically align) with the third openings 324 of the ground structure 302. Additionally, each of the openings 303 formed by the second openings 322 of the housing 304 and the third openings 324 of the ground structure 302 has an inner wall 708 that is substantially straight (e.g., vertically straight). In other words, the wall 708 does not have a varying and/or tapering profile. Formation of the wall 708 having a straight profile is a result of the insert molding process used to attach or integrally form the housing 304 and the ground structure 302. In some examples, the openings 320, 322 and 324 can be formed by a secondary process after the housing 304 is overmolded with the ground structure 302. For example, after fabrication of the ground structure 302 and the housing 304 (i.e., when the housing 304 is coupled to the ground structure 302), the openings 320, 322 and 324 can be formed via drilling and/or any other suitable manufacturing process(es).

Figures 7G, 7H, 7I, 7J, 7K, 7L:
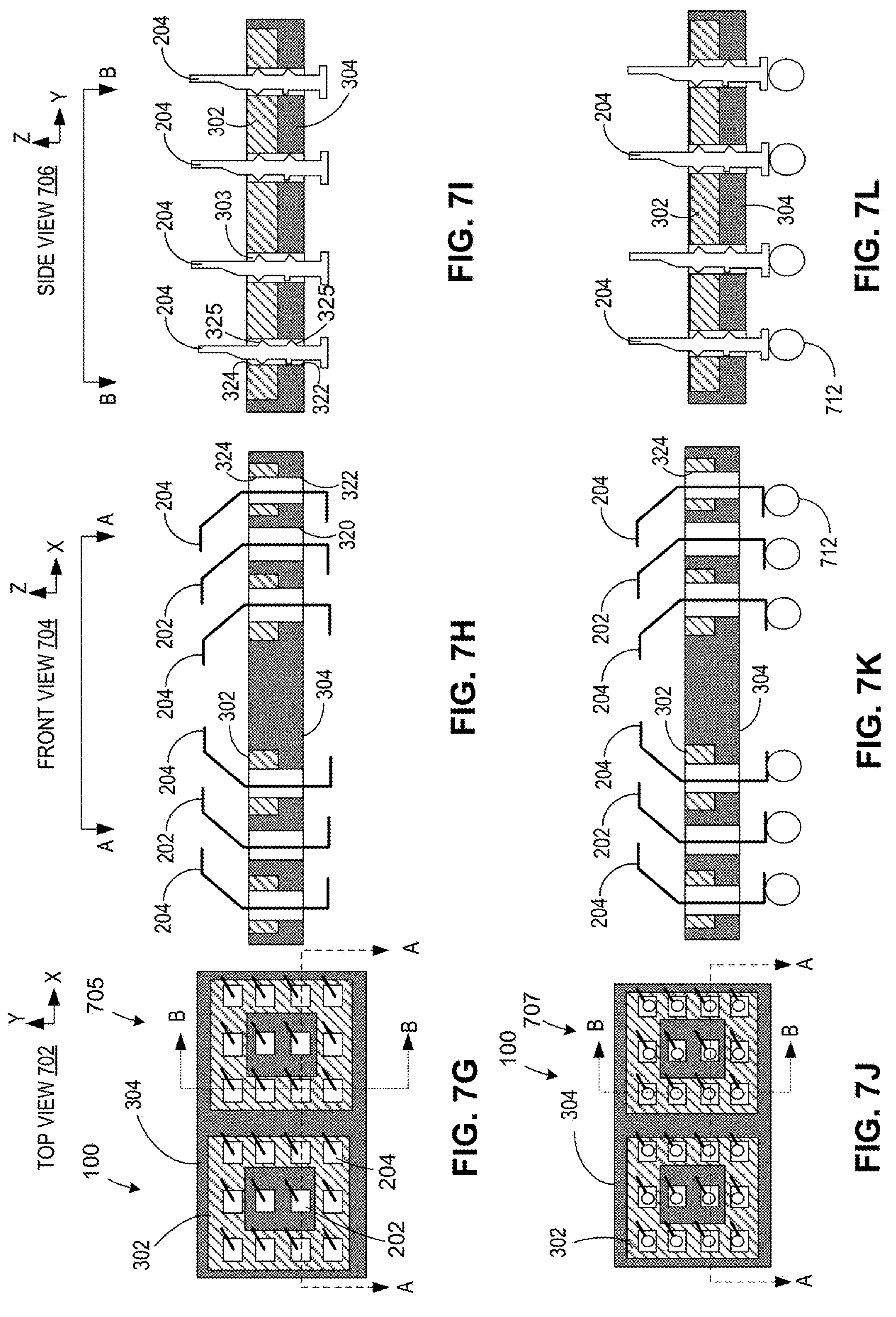

The pins are then coupled within the ground structure and the housing (block 606). Referring to FIGS. 7G-7I, the pins 202, 204 are inserted into the openings 303 of the socket 100 via, for example, press-fit (e.g., stitching). For example, the pins 202, 204 can be stamped copper contacts. In other examples, other conductive materials (e.g., gold, aluminum, etc.) can be used to form the pins 202, 204 via a stamping process. The pins 202, 204 of the illustrated example are stitched with the ground structure 302 and/or the housing 304 when press-fit with the ground structure 302 and/or the housing 304. Specifically, the signal pins 202 are press-fit, inserted, or otherwise stitched with the openings 303 defined by the first openings 320 and the ground pins 204 are press-fit, inserted, or otherwise stitched with the openings 303 defined by the second openings 322 of the housing 304 and the third openings 324 of the ground structure 302.

In the illustrated example of FIGS. 7G-7I, the ground structure 302 electrically couples the ground pins 204. Specifically, when the ground pins 204 are inserted into the housing 304 and the ground structure 302, the first portion **302*a* of the ground structure 302 electrically couples (e.g., connects) the first plurality of ground pins 204 that engage the first portion 302*a* and the second portion 302*b* of the ground structure 302 electrically couples (e.g., connects) the second group 316 of the ground pins 204 that engage the second portion 302*b*. For example, referring to FIGS. 7H and 7I, the signal pins 202 are stitched into the housing 304 and the ground pins 204 are stitched into the ground structure 302 (e.g., and in some instances, the housing 304 and the ground structure 302) via the protrusions 325. In some examples, the ground structure 302 can be attached or coupled to the housing 304** via adhesive, chemical bonding, clips, screws, and/or any other suitable fastener(s).

At block 608, solder joints can be coupled to the pins. Referring to FIGS. 7J-7L, example solder balls 712 are coupled to the ground pins 204 and/or the signal pins 202) via, for example, soldering or any other manufacturing technique(s).

Figure 8:
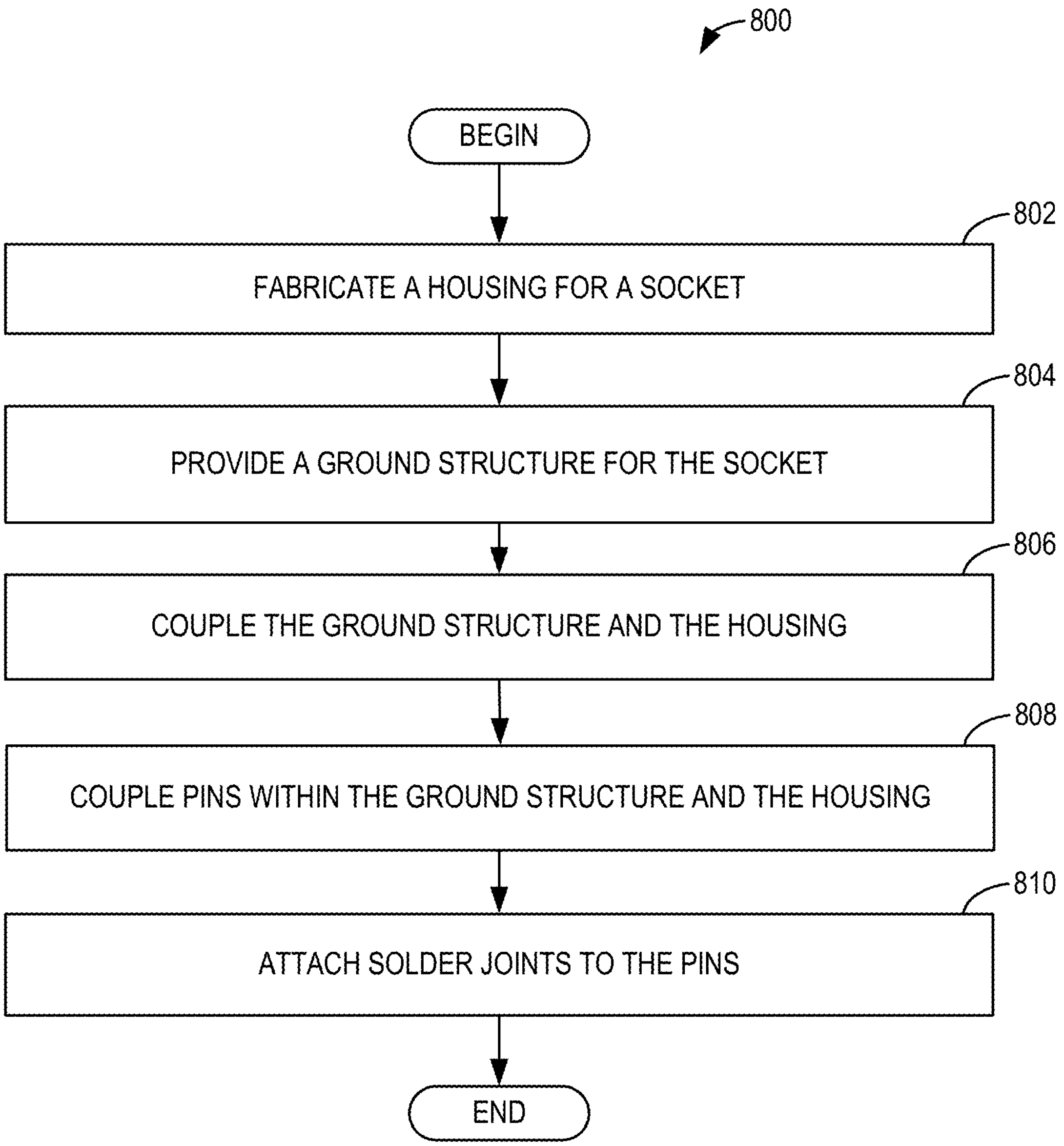
FIG. 8 is a flowchart of another example method of manufacturing an example socket disclosed herein.

FIG. 8 is a flowchart of another example method 800 manufacturing an example socket disclosed herein. To facilitate discussion of the example method 800, the example method 800 will be described in connection with another example socket 900 of FIGS. 9A-9L. FIGS. 9A-9L depict a series of figures showing the example socket 900 at various manufacturing stages 901, 903, 905, 907 corresponding to the example method of FIG. 8. FIGS. 9A, 9D, 9G and 9J are example top views 950 of the socket 100 at the various manufacturing stages 901, 903, 905, 907. FIGS. 9B, 9E, 9H and 9K are cross-sectional front views 952 taken along line A-A of FIGS. 9A, 9D, 9G, and 9J, respectively. FIGS. 9C, 9F, 9I, and 9L are example side views 954 taken along line B-B of FIGS. 9A, 9D, 9G, and 9J, respectively.

Those components of the example socket 900 that are substantially similar to the components of the socket 100 of FIGS. 1-5 described above and have functions substantially similar or identical to the functions of those components will not be described in detail again below. Instead, the interested reader is referred to the above corresponding descriptions. To facilitate this process, similar reference numbers will be used for like structures. For example, the socket 900 of FIGS. 9A-9L is substantially similar to the socket 100 of FIGS. 1-5 except that the socket 900 provides openings 902 that are different compared to the openings 303 of FIGS. 1-5. In contrast to the openings 303 of FIGS. 1-5, the openings 902 of the illustrated example have a varying profile or shape. Additionally, in contrast to the example method of FIG. 6, the method of FIG. 8 employs a multi-stage stitching process. A first stitching process is employed to couple a ground structure 302 and a housing 304 and a second stitching process is employed to couple the pins 202, 204 and the socket 900.

While an example manner of forming the example socket 100 has been illustrated in FIG. 8, one of the steps and/or processes illustrated in FIG. 8 may be combined, divided, re-arranged, omitted, eliminated and/or implemented in any other way. Further still, the example methods of FIG. 8 may include processes and/or steps in addition to, or instead of, those illustrated in FIG. 8 and/or may include more than one of any or all of the illustrated processes and/or steps. Further, although the example methods are described with reference to the flowcharts illustrated in FIG. 8, many other methods or processes of forming electronic packages may alternatively be used.

Figure 9A:
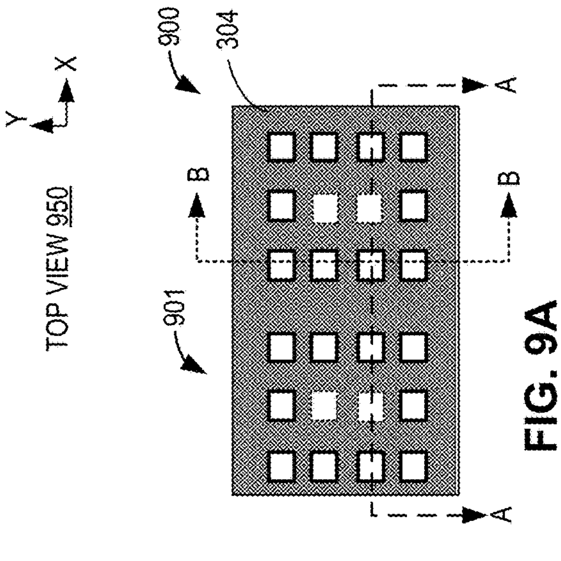
FIG. 9A-9L depict another example socket disclosed herein at various manufacturing stages corresponding to the example method of FIG. 8.
Figure 9B:
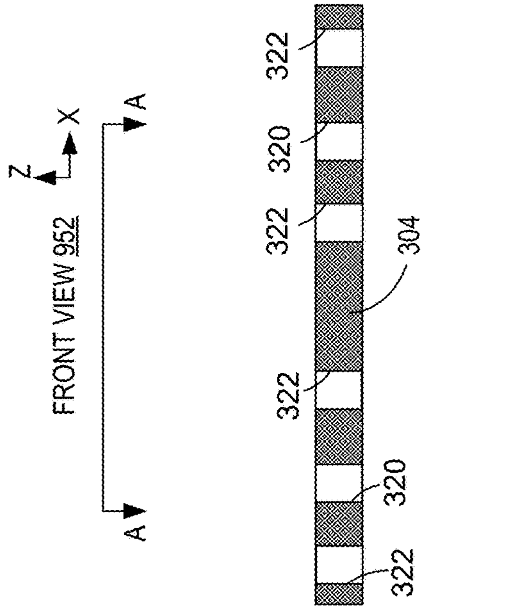
Figure 9C:
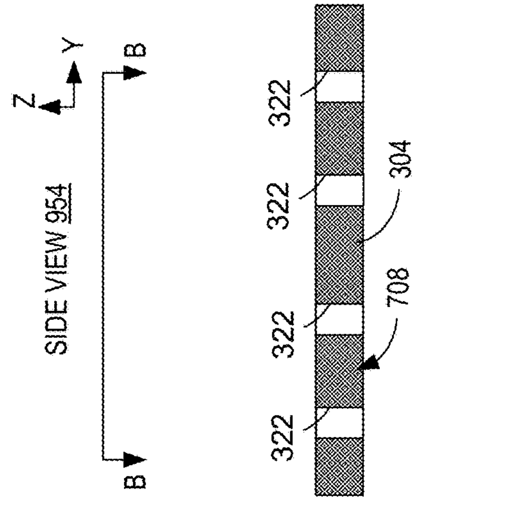

The method 800 of FIG. 8 begins by forming a housing of a socket (block 802). For example, a housing can be formed via an injection-molding process. Referring to FIGS. 9A-9C, the housing 304 is formed via injection molding. Additionally, the openings 320 and 322 of the housing 304 are formed during the injection molding process. However, in some examples, the housing 304 and/or the openings 320, 322 can be formed via machining, drilling, additive manufacturing, a combination thereof, and/or any other suitable manufacturing process(es).

Figure 9D:
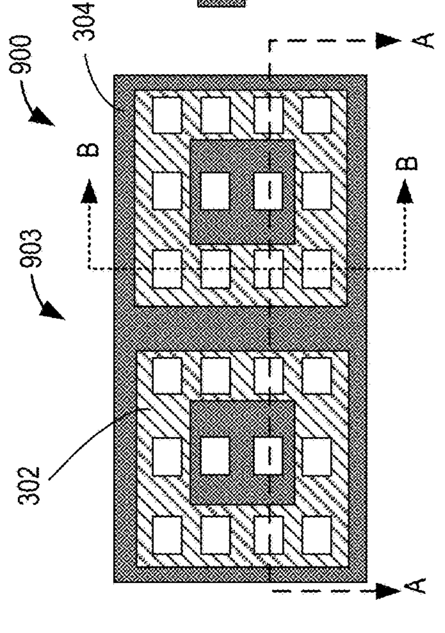
Figure 9E:
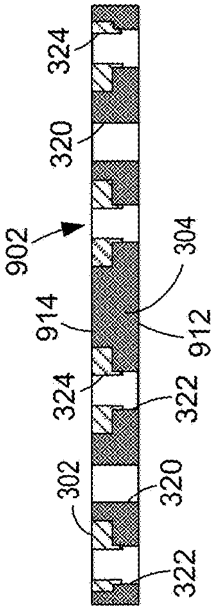
Figure 9F:
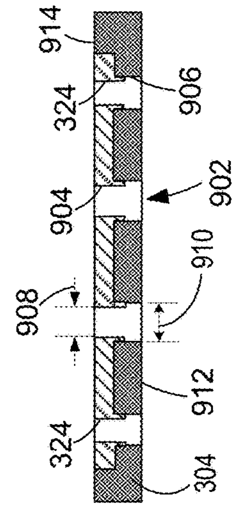

At block 804, a ground structure is provided for the socket. Specifically, the ground structure is fabricated or obtained. The ground structure is plate made of an electrically conductive material. Referring to FIGS. 9D-9F, the ground structure 302 is formed as a plate and includes the openings 324 to receive the contacts 102. In some examples, the ground structure 302 is formed via stamping. In some examples, the ground structure is formed via machining, additive manufacturing and/or any other suitable manufacturing process(es). In some examples, the openings 324 are formed via drilling after formation of the ground structure 302.

At block 806, the ground structure is coupled to the housing. Referring to FIGS. 9D-9F, the ground structure 302 of the illustrated example coupled (e.g., stitched) to the housing 304 via press-fit. When the ground structure 302 is press-fit to the housing 304, the openings 324 of the ground structure 302 partially align with the openings 322 of the housing 304 to define the openings 902 of the socket 900 based on a portion of the ground structure 302 which partially overhangs into the openings 324. The openings 902 of the socket 900 defined by the openings 324 of the ground structure 302 and the openings 322 of the housing 304 are different than the openings 303 of FIGS. 1-5, and 7A-7J. Specifically, a wall 904 of the opening 324 of the ground structure 302 overhangs or overlaps a wall 906 of the opening 322 of the housing 304. As a result, a first dimension 908 (e.g., a first length) of the openings 324 of the ground structure 302 is less than the second dimension 910 (e.g., a second length) of the openings 322 of the housing 304. Thus, when the openings 322 and 324 are in alignment to define the openings 902 of the socket 900, the openings 902 have a varying shape or profile between a first side 912 (e.g., a bottom surface) of the socket 900 and a second side 914 (e.g., a top surface) of the socket 900 opposite the first side 912 (e.g., in the z-direction). Thus, a size of the opening varies between the first side 912 and the second side 914 of the socket 900.

Figures 9G, 9H, 9I, 9J, 9K, 9L:
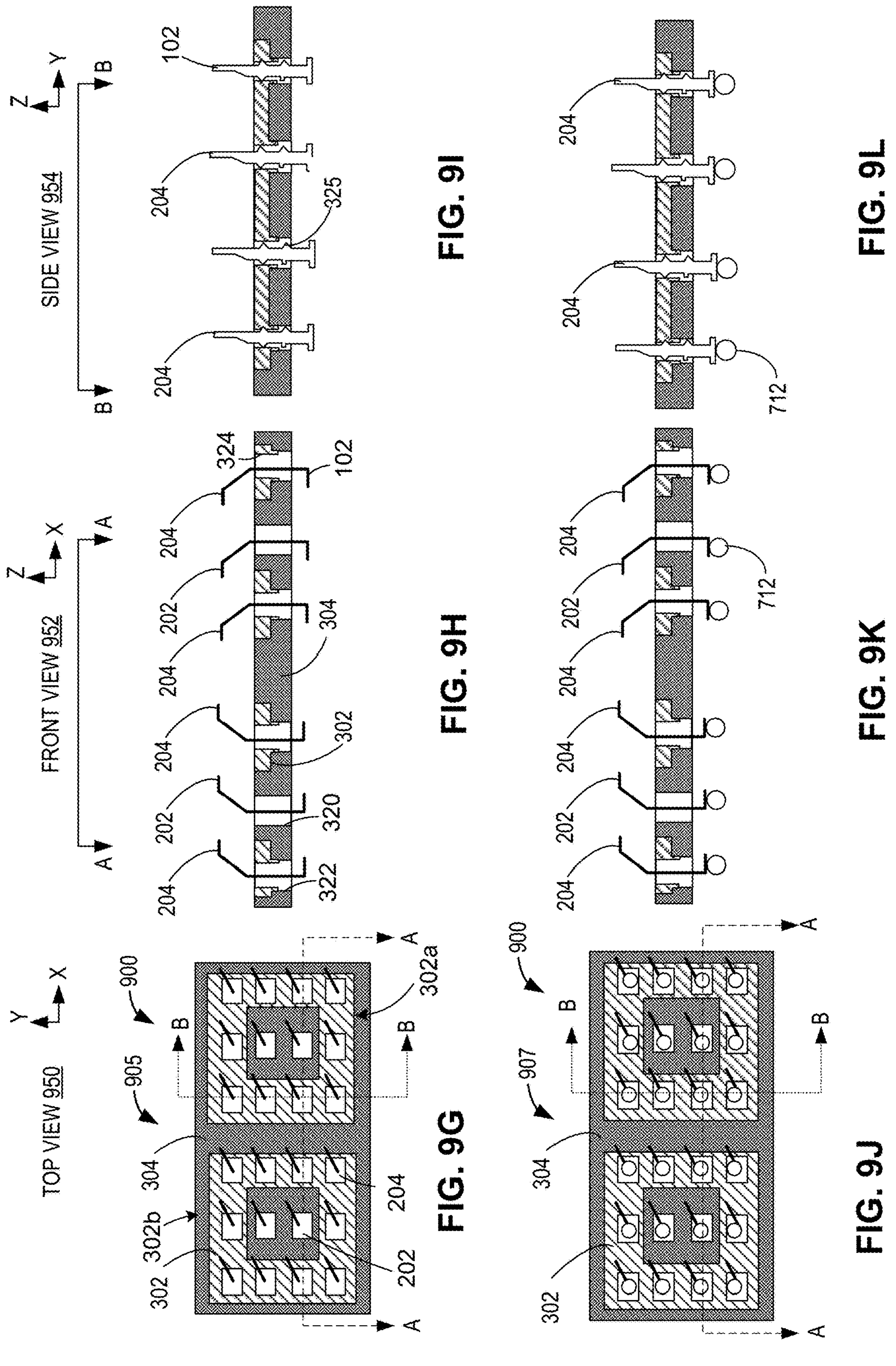

At block 808, a plurality of pins are coupled to a socket. Referring to FIGS. 9G-9I, the pins 202, 204 of the illustrated example coupled (e.g., stitched) to the socket 900 via press-fit. In some examples, the pins 202, 204 may be generated from stamped copper contacts. However, in other examples, other conductive materials (e.g., gold, aluminum, etc.) may be used to generate the pins 202, 204 (e.g., metal interconnects, contacts) in a stamping process. The ground pins 204 are coupled to the ground structure 302 and the signal pins 202 coupled to the housing 304 via a stitching process. Specifically, the ground pins 204 are coupled to the socket 900 via the openings 902 defined by the second openings 322 of the housing 304 and the third openings 324 of the ground structure 302. The signal pins 202 are coupled to the socket 900 via the openings 902 defined by the first openings 320 of the housing 304. Specifically, the ground structure 302 electrically couples the ground pins 204. In the illustrated example of FIGS. 9G-9I, when the pins 202, 204 are inserted into the housing 304 and the ground structure 302, a first portion 302*a* of the ground structure 302 electrically couples (e.g., connects in series) a first group 312 of the ground pins 204 (e.g., a first plurality of the ground pins 204) and a second portion 302*b* of the ground structure 302 electrically couples (e.g., connects in series) a second group 316 of the ground pins 204 (e.g., a second plurality of the ground pins 204). The pins 202, 204 of the illustrated example include protrusions 325 (e.g., teeth, hooks, etc.) that couple (e.g., embed) with the housing 304 and/or the ground structure 302 to couple the pins 202, 204 to the ground structure 302 and/or the housing 304.

At block 810, solder joints are coupled to the pins. Referring to FIGS. 9J-9L, solder balls 712 are coupled to the ground pins 204 and the signal pins 202.

In other examples, example sockets disclosed herein can be manufactured using other manufacturing process(es) and/or techniques. For example, a socket can be formed by insert or overmolding the socket assembly together. For instance, the pins may be skived pins which can be positioned inside a frame (e.g., skived)

The foregoing examples of the sockets 100, 350, 360 and 900 teach or suggest different features. Although each example socket 100, 350, 360 and 900 disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

There are other manufacturing processes to electrically connect the ground structure 302 to the pins 202, 204. One alternative is to use a skived bus bar. The skived bus bar includes skived pins which generate manufacturing options. One manufacturing option is to make the socket 100 an insert molded or over-molded frame that has the ground pins 204 inside the frame already (through a skived process), while the signal pins 202 are stitched such as in the process of FIG. 7 and/or FIG. 9. The signal pins 202 may be stamped copper connections such as in the process of FIG. 7 and/or FIG. 9. A second manufacturing option is to use solder or conductive adhesive to attach the pins 202, 204 (e.g., electrical connections) instead of press fitting the pins 202, 204 such as in the process of FIG. 7 and/or FIG. 9.

In some examples, to electrically connect the ground pins 204 in a selected area of the socket, a fixed location for the ground pins 204 is to be finalized. Typically, a fixed location for the ground pins 204 would reduce the flexibility of the CPU pinout arrangement. However, as the CPU I/O data rate increases for PCIe 6.0 and beyond, the differential pinout is likely to be uniformly arranged. The uniform arrangement for PCIe 6.0 results in a regular pin assignment and well-defined differential area without customization as the locations of the grounds pins 204 are predictable. Thus, a requirement for fixed ground pin locations is not an issue for the techniques disclosed herein. In some examples, a mixed pitch socket pin pattern has the differential pinout in a separate patch.

The example sockets 100, 350, 360, 900 disclosed herein may be included in any suitable electronic component. FIGS. 10-14 illustrate various examples of apparatus that may be provided with example sockets 100, 350, 360, 900 disclosed herein.

Figure 10:
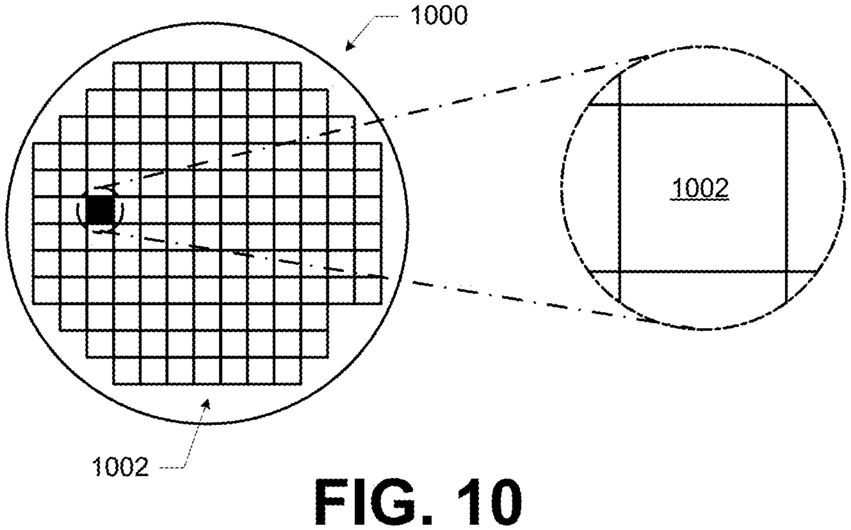
FIG. 10 is a top view of a wafer and dies that may be included in an IC package constructed in accordance with teachings disclosed herein that is structured to interface with the socket of FIG. 1.

FIG. 10 is a top view of a wafer 1000 and dies 1002 that may be included in an IC package with a substrate that may connect to the example sockets 100, 350, 360, 900 (e.g., as discussed below with reference to FIG. 12) in accordance with any of the examples disclosed herein. The wafer 1000 may be composed of semiconductor material and may include one or more dies 1002 having IC structures formed on a surface of the wafer 1000. Each of the dies 1002 may be a repeating unit of a semiconductor product that includes any suitable IC. After the fabrication of the semiconductor product is complete, the wafer 1000 may undergo a singulation process in which the dies 1002 are separated from one another to provide discrete "chips" of the semiconductor product. The die 1002 may include one or more transistors (e.g., some of the transistors 1140 of FIG. 11, discussed below), supporting circuitry to route electrical signals to the transistors, passive components (e.g., signal traces, resistors, capacitors, or inductors), and/or any other IC components. In some examples, the wafer 1000 or the die 1002 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1002. For example, a memory array formed by multiple memory devices may be formed on a same die 1002 as processor circuitry (e.g., the processor circuitry 1402 of FIG. 14) or other logic that is configured to store information in the memory devices or execute instructions stored in the memory array.

Figure 11:
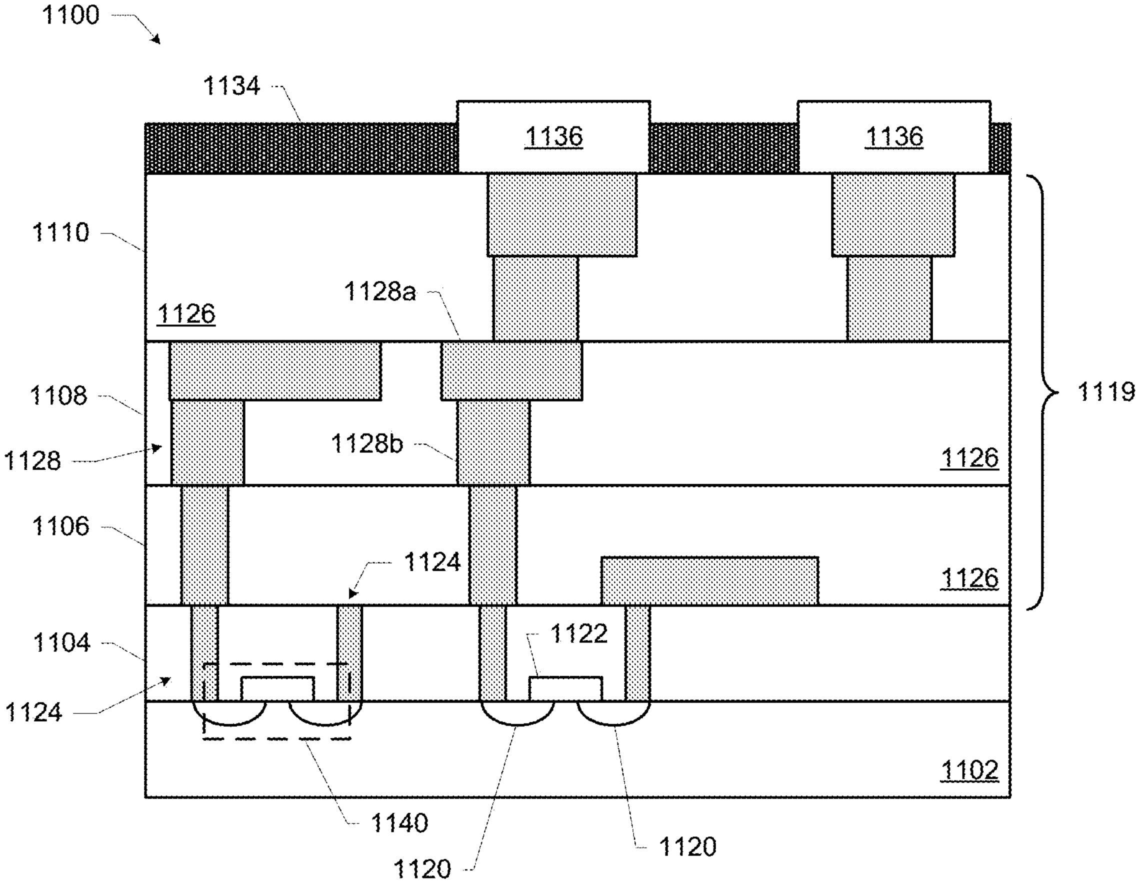
FIG. 11 is a cross-sectional side view of an IC device that may be included in an IC package constructed in accordance with teachings disclosed herein that is structured to interface with the socket of FIG. 1.

FIG. 11 is a cross-sectional side view of an IC device 1100 that may be included in an IC package with a substrate that may connect to the example sockets 100, 350, 360, 900 (e.g., as discussed below with reference to FIG. 12), in accordance with any of the examples disclosed herein. One or more of the IC devices 1100 may be included in one or more dies 1002 (FIG. 10). The IC device 1100 may be formed on a die substrate 1102 (e.g., the wafer 1000 of FIG. 10) and may be included in a die (e.g., the die 1002 of FIG. 10). The die substrate 1102 may be a semiconductor substrate composed of semiconductor material systems including, for example, n-type or p-type materials systems (or a combination of both). The die substrate 1102 may include, for example, a crystalline substrate formed using a bulk silicon or a silicon-on-insulator (SOI) substructure. In some examples, the die substrate 1102 may be formed using alternative materials, which may or may not be combined with silicon, which include but are not limited to germanium, indium antimonide, lead telluride, indium arsenide, indium phosphide, gallium arsenide, or gallium antimonide. Further materials classified as group II-VI, III-V, or IV may also be used to form the die substrate 1102. Although a few examples of materials from which the die substrate 1102 may be formed are described here, any material that may serve as a foundation for an IC device 1100 may be used. The die substrate 1102 may be part of a singulated die (e.g., the dies 1002 of FIG. 10) or a wafer (e.g., the wafer 1000 of FIG. 10).

The IC device 1100 may include one or more device layers 1104 disposed on the die substrate 1102. The device layer 1104 may include features of one or more transistors 1140 (e.g., metal oxide semiconductor field-effect transistors (MOSFETs)) formed on the die substrate 1102. The device layer 1104 may include, for example, one or more source and/or drain (S/D) regions 1120, a gate 1122 to control current flow in the transistors 1140 between the S/D regions 1120, and one or more S/D contacts 1124 to route electrical signals to/from the S/D regions 1120. The transistors 1140 may include additional features not depicted for the sake of clarity, such as device isolation regions, gate contacts, and the like. The transistors 1140 are not limited to the type and configuration depicted in FIG. 11 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon and nanowire transistors.

Each transistor 1140 may include a gate 1122 formed of at least two layers, a gate dielectric and a gate electrode. The gate dielectric may include one layer or a stack of layers. The one or more layers may include silicon oxide, silicon dioxide, silicon carbide, and/or a high-k dielectric material. The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some examples, an annealing process may be conducted on the gate dielectric to improve its quality when a high-k material is used.

The gate electrode may be formed on the gate dielectric and may include at least one p-type work function metal or n-type work function metal, depending on whether the transistor 1140 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer. For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some examples, when viewed as a cross-section of the transistor 1140 along the source-channel-drain direction, the gate electrode may consist of a U-shaped structure that includes a bottom portion substantially parallel to the surface of the die substrate 1102 and two sidewall portions that are substantially perpendicular to the top surface of the die substrate 1102. In other examples, at least one of the metal layers that form the gate electrode may simply be a planar layer that is substantially parallel to the top surface of the die substrate 1102 and does not include sidewall portions substantially perpendicular to the top surface of the die substrate 1102. In other examples, the gate electrode may consist of a combination of U-shaped structures and planar, non-U-shaped structures. For example, the gate electrode may consist of one or more U-shaped metal layers formed atop one or more planar, non-U-shaped layers.

In some examples, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some examples, a plurality of spacer pairs may be used; for instance, two pairs, three pairs, or four pairs of sidewall spacers may be formed on opposing sides of the gate stack.

The S/D regions 1120 may be formed within the die substrate 1102 adjacent to the gate 1122 of each transistor 1140. The S/D regions 1120 may be formed using an implantation/diffusion process or an etching/deposition process, for example. In the former process, dopants such as boron, aluminum, antimony, phosphorous, or arsenic may be ion-implanted into the die substrate 1102 to form the S/D regions 1120. An annealing process that activates the dopants and causes them to diffuse farther into the die substrate 1102 may follow the ion-implantation process. In the latter process, the die substrate 1102 may first be etched to form recesses at the locations of the S/D regions 1120. An epitaxial deposition process may then be carried out to fill the recesses with material that is used to fabricate the S/D regions 1120. In some implementations, the S/D regions 1120 may be fabricated using a silicon alloy such as silicon germanium or silicon carbide. In some examples, the epitaxially deposited silicon alloy may be doped in situ with dopants such as boron, arsenic, or phosphorous. In some examples, the S/D regions 1120 may be formed using one or more alternate semiconductor materials such as germanium or a group III-V material or alloy. In further examples, one or more layers of metal and/or metal alloys may be used to form the S/D regions 1120.

Electrical signals, such as power and/or input/output (I/O) signals, may be routed to and/or from the devices (e.g., transistors 1140) of the device layer 1104 through one or more interconnect layers disposed on the device layer 1104 (illustrated in FIG. 11 as interconnect layers 1106-1110). For example, electrically conductive features of the device layer 1104 (e.g., the gate 1122 and the S/D contacts 1124) may be electrically coupled with the interconnect structures 1128 of the interconnect layers 1106-1110. The one or more interconnect layers 1106-1110 may form a metallization stack (also referred to as an "ILD stack") 1119 of the IC device 1100.

The interconnect structures 1128 may be arranged within the interconnect layers 1106-1110 to route electrical signals according to a wide variety of designs (in particular, the arrangement is not limited to the particular configuration of interconnect structures 1128 depicted in FIG. 11). Although a particular number of interconnect layers 1106-1110 is depicted in FIG. 11, examples of the present disclosure include IC devices having more or fewer interconnect layers than depicted.

In some examples, the interconnect structures 1128 may include lines 1128*a* and/or vias 1128*b* filled with an electrically conductive material such as a metal. The lines 1128*a* may be arranged to route electrical signals in a direction of a plane that is substantially parallel with a surface of the die substrate 1102 upon which the device layer 1104 is formed. For example, the lines 1128*a* may route electrical signals in a direction in and out of the page from the perspective of FIG. 11. The vias 1128*b* may be arranged to route electrical signals in a direction of a plane that is substantially perpendicular to the surface of the die substrate 1102 upon which the device layer 1104 is formed. In some examples, the vias 1128*b* may electrically couple lines 1128*a* of different interconnect layers 1106-1110 together.

The interconnect layers 1106-1110 may include a dielectric material 1126 disposed between the interconnect structures 1128, as shown in FIG. 11. In some examples, the dielectric material 1126 disposed between the interconnect structures 1128 in different ones of the interconnect layers 1106-1110 may have different compositions; in other examples, the composition of the dielectric material 1126 between different interconnect layers 1106-1110 may be the same.

A first interconnect layer 1106 (referred to as Metal 1 or "M1") may be formed directly on the device layer 1104. In some examples, the first interconnect layer 1106 may include lines 1128*a* and/or vias 1128*b*, as shown. The lines 1128*a* of the first interconnect layer 1106 may be coupled with contacts (e.g., the S/D contacts 1124) of the device layer 1104.

A second interconnect layer 1108 (referred to as Metal 2 or "M2") may be formed directly on the first interconnect layer 1106. In some examples, the second interconnect layer 1108 may include vias 1128*b* to couple the lines 1128*a* of the second interconnect layer 1108 with the lines 1128*a* of the first interconnect layer 1106. Although the lines 1128*a* and the vias 1128*b* are structurally delineated with a line within each interconnect layer (e.g., within the second interconnect layer 1108) for the sake of clarity, the lines 1128*a* and the vias 1128*b* may be structurally and/or materially contiguous (e.g., simultaneously filled during a dual-damascene process) in some examples.

A third interconnect layer 1110 (referred to as Metal 3 or "M3") (and additional interconnect layers, as desired) may be formed in succession on the second interconnect layer 1108 according to similar techniques and configurations described in connection with the second interconnect layer 1108 or the first interconnect layer 1106. In some examples, the interconnect layers that are "higher up" in the metallization stack 1119 in the IC device 1100 (i.e., further away from the device layer 1104) may be thicker.

The IC device 1100 may include a solder resist material 1134 (e.g., polyimide or similar material) and one or more conductive contacts 1136 formed on the interconnect layers 1106-1110. In FIG. 11, the conductive contacts 1136 are illustrated as taking the form of bond pads. The conductive contacts 1136 may be electrically coupled with the interconnect structures 1128 and configured to route the electrical signals of the transistor(s) 1140 to other external devices. For example, solder bonds may be formed on the one or more conductive contacts 1136 to mechanically and/or electrically couple a chip including the IC device 1100 with another component (e.g., a circuit board). The IC device 1100 may include additional or alternate structures to route the electrical signals from the interconnect layers 1106-1110; for example, the conductive contacts 1136 may include other analogous features (e.g., posts) that route the electrical signals to external components.

Figure 12:
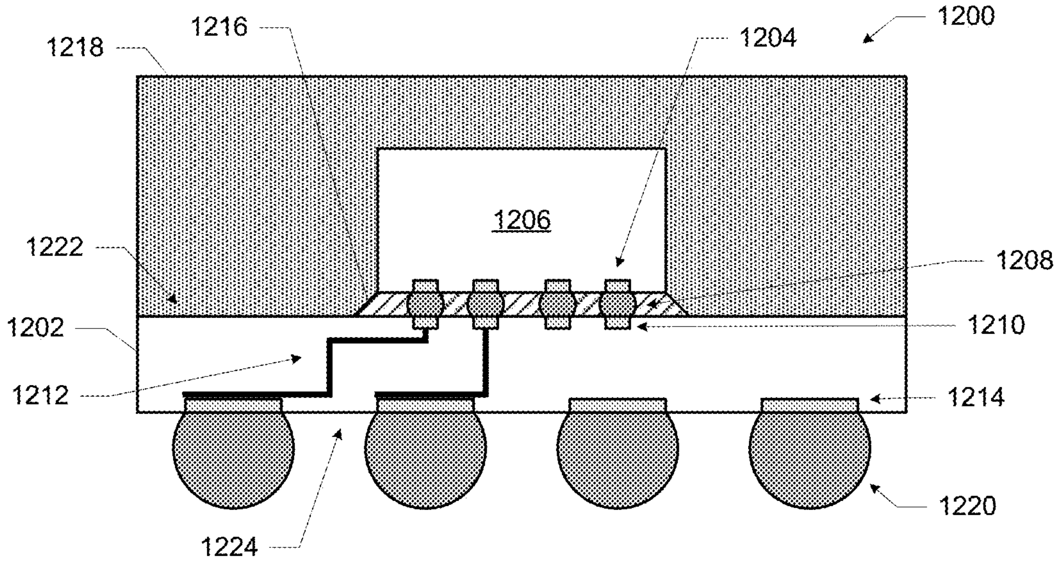
FIG. 12 is a cross-sectional side view of an IC package that may include a socket, in accordance with various examples.

FIG. 12 is a cross-sectional view of an example IC package 1200 that may include one or more substrates that may connect to the example sockets 100, 350, 360, 900. The package substrate 1202 may be formed of a dielectric material, and may have conductive pathways extending through the dielectric material between upper and lower faces 1222, 1224, or between different locations on the upper face 1222, and/or between different locations on the lower face 1224. These conductive pathways may take the form of any of the interconnects 1128 discussed above with reference to FIG. 11. In some examples, any number of substrates that may connect to the example sockets 100, 350, 360, 900 (with any suitable structure) may be included in a package substrate 1202. In some examples, no substrates that may connect to the example sockets 100, 350, 360, 900 may be included in the package substrate 1202.

The IC package 1200 may include a die 1206 coupled to the package substrate 1202 via conductive contacts 1204 of the die 1206, first-level interconnects 1208, and conductive contacts 1210 of the package substrate 1202. The conductive contacts 1210 may be coupled to conductive pathways 1212 through the package substrate 1202, allowing circuitry within the die 1206 to electrically couple to various ones of the conductive contacts 1214 or to the substrate that may connect to the example sockets 100, 350, 360, 900 (or to other devices included in the package substrate 1202, not shown). The first-level interconnects 1208 illustrated in FIG. 12 are solder bumps, but any suitable first-level interconnects 1208 may be used. As used herein, a "conductive contact" may refer to a portion of conductive material (e.g., metal) serving as an electrical interface between different components; conductive contacts may be recessed in, flush with, or extending away from a surface of a component, and may take any suitable form (e.g., a conductive pad or socket).

In some examples, an underfill material 1216 may be disposed between the die 1206 and the package substrate 1202 around the first-level interconnects 1208, and a mold compound 1218 may be disposed around the die 1206 and in contact with the package substrate 1202. In some examples, the underfill material 1216 may be the same as the mold compound 1218. Example materials that may be used for the underfill material 1216 and the mold compound 1218 are epoxy mold materials, as suitable. Second-level interconnects 1220 may be coupled to the conductive contacts 1214. The second-level interconnects 1220 illustrated in FIG. 12 are solder balls (e.g., for a ball grid array arrangement), but any suitable second-level interconnects 1220 may be used (e.g., pins in a pin grid array arrangement or lands in a land grid array arrangement). The second-level interconnects 1220 may be used to couple the IC package 1200 to another component, such as a circuit board (e.g., a motherboard), an interposer, or another IC package, as known in the art and as discussed below with reference to FIG. 12.

In FIG. 12, the IC package 1200 is a flip chip package, and includes a substrate that may connect to the example sockets 100, 350, 360, 900 in the package substrate 1202. The number and location of the substrate that may connect to the example sockets 100, 350, 360, 900 in the package substrate 1202 of the IC package 1200 is simply illustrative, and any number of substrates that may connect to the example sockets 100, 350, 360, 900 (with any suitable structure) may be included in a package substrate 1202. In some examples, no substrates that may connect to the example sockets 100, 350, 360, 900 may be included in the package substrate 1202. The die 1206 may take the form of any of the examples of the die 1202 discussed herein (e.g., may include any of the examples of the IC device 1100). In some examples, the die 1206 may include one or more substrates that may connect to the example sockets 100, 350, 360, 900 (e.g., as discussed above with reference to FIG. 10 and FIG. 11); in other examples, the die 1206 may not include any substrates that may connect to the example sockets 100, 350, 360, 900.

Although the IC package 1200 illustrated in FIG. 12 is a flip chip package, other package architectures may be used. For example, the IC package 1200 may be a ball grid array (BGA) package, such as an embedded wafer-level ball grid array (eWLB) package. In another example, the IC package 1200 may be a wafer-level chip scale package (WLCSP) or a panel fanout (FO) package. Although a single die 1206 is illustrated in the IC package 1200 of FIG. 12, an IC package 1200 may include multiple dies 1206 (e.g., with one or more of the multiple dies 1206 coupled to a substrate that may connect to the example sockets 100, 350, 360, 900 included in the package substrate 1202). An IC package 1200 may include additional passive components, such as surface-mount resistors, capacitors, and inductors disposed on the first face 1222 or the second face 1224 of the package substrate 1202. More generally, an IC package 1200 may include any other active or passive components known in the art.

Figure 13:
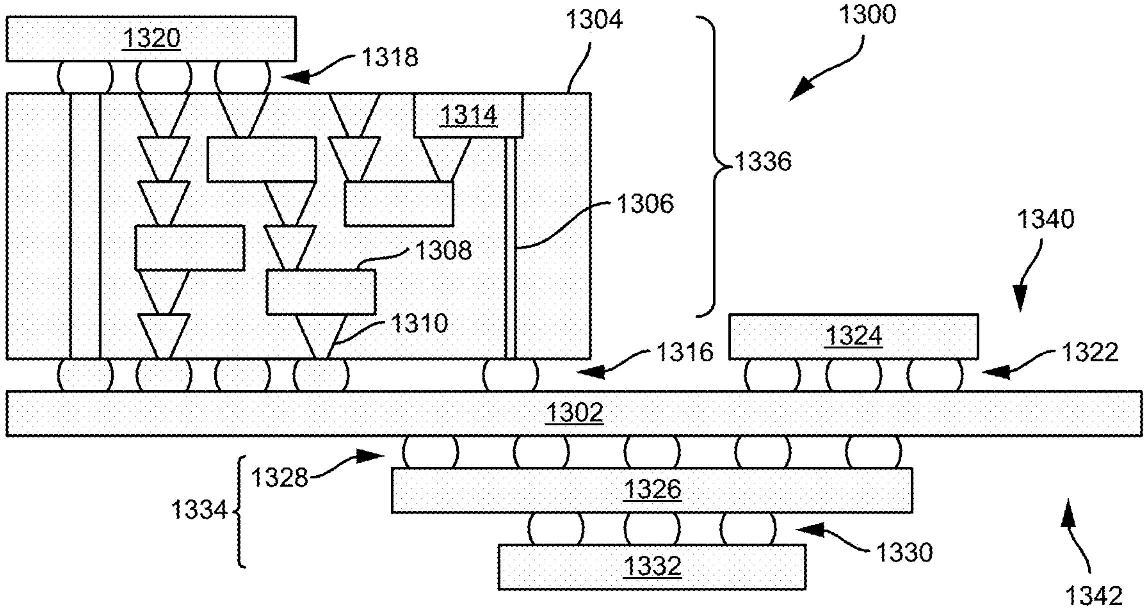
FIG. 13 is a cross-sectional side view of an IC device assembly that may include an IC package constructed in accordance with teachings disclosed herein.

FIG. 13 is a cross-sectional side view of an IC device assembly 1300 that may include the substrate that may connect to the example sockets 100, 350, 360, 900 disclosed herein. In some examples, the IC device assembly corresponds to the substrate that may connect to the example sockets 100, 350, 360, 900. The IC device assembly 1300 includes a number of components disposed on a circuit board 1302 (which may be, for example, a motherboard). The IC device assembly 1300 includes components disposed on a first face 1340 of the circuit board 1302 and an opposing second face 1342 of the circuit board 1302; generally, components may be disposed on one or both faces 1340 and 1342.

In some examples, the circuit board 1302 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1302. In other examples, the circuit board 1302 may be a non-PCB substrate.

The IC device assembly 1300 illustrated in FIG. 13 includes a package-on-interposer structure 1336 coupled to the first face 1340 of the circuit board 1302 by coupling components 1316. The coupling components 1316 may electrically and mechanically couple the package-on-interposer structure 1336 to the circuit board 1302, and may include solder balls (as shown in FIG. 13), male and female portions of a socket, an adhesive, an underfill material, and/or any other suitable electrical and/or mechanical coupling structure.

The package-on-interposer structure 1336 may include an IC package 1320 coupled to an interposer 1304 by coupling components 1318. The coupling components 1318 may take any suitable form for the application, such as the forms discussed above with reference to the coupling components 1316. Although a single IC package 1320 is shown in FIG. 13, multiple IC packages may be coupled to the interposer 1304; indeed, additional interposers may be coupled to the interposer 1304. The interposer 1304 may provide an intervening substrate used to bridge the circuit board 1302 and the IC package 1320. The IC package 1320 may be or include, for example, a die (the die 1002 of FIG. 10), an IC device (e.g., the IC device 1100 of FIG. 11), or any other suitable component. Generally, the interposer 1304 may spread a connection to a wider pitch or reroute a connection to a different connection. For example, the interposer 1304 may couple the IC package 1320 (e.g., a die) to a set of BGA conductive contacts of the coupling components 1316 for coupling to the circuit board 1302. In the example illustrated in FIG. 13, the IC package 1320 and the circuit board 1302 are attached to opposing sides of the interposer 1304; in other examples, the IC package 1320 and the circuit board 1302 may be attached to a same side of the interposer 1304. In some examples, three or more components may be interconnected by way of the interposer 1304.

In some examples, the interposer 1304 may be formed as a PCB, including multiple metal layers separated from one another by layers of dielectric material and interconnected by electrically conductive vias. In some examples, the interposer 1304 may be formed of an epoxy resin, a fiberglass-reinforced epoxy resin, an epoxy resin with inorganic fillers, a ceramic material, or a polymer material such as polyimide. In some examples, the interposer 1304 may be formed of alternate rigid or flexible materials that may include the same materials described above for use in a semiconductor substrate, such as silicon, germanium, and other group III-V and group IV materials. The interposer 1304 may include metal interconnects 1308 and vias 1310, including but not limited to through-silicon vias (TSVs) 1306. The interposer 1304 may further include embedded devices 1314, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1304. The package-on-interposer structure 1336 may take the form of any of the package-on-interposer structures known in the art.

The IC device assembly 1300 may include an IC package 1324 coupled to the first face 1340 of the circuit board 1302 by coupling components 1322. The coupling components 1322 may take the form of any of the examples discussed above with reference to the coupling components 1316, and the IC package 1324 may take the form of any of the examples discussed above with reference to the IC package 1320.

The IC device assembly 1300 illustrated in FIG. 13 includes a package-on-package structure 1334 coupled to the second face 1342 of the circuit board 1302 by coupling components 1328. The package-on-package structure 1334 may include a first IC package 1326 and a second IC package 1332 coupled together by coupling components 1330 such that the first IC package 1326 is disposed between the circuit board 1302 and the second IC package 1332. The coupling components 1328, 1330 may take the form of any of the examples of the coupling components 1316 discussed above, and the IC packages 1326, 1332 may take the form of any of the examples of the IC package 1320 discussed above. The package-on-package structure 1334 may be configured in accordance with any of the package-on-package structures known in the art.

Figure 14:
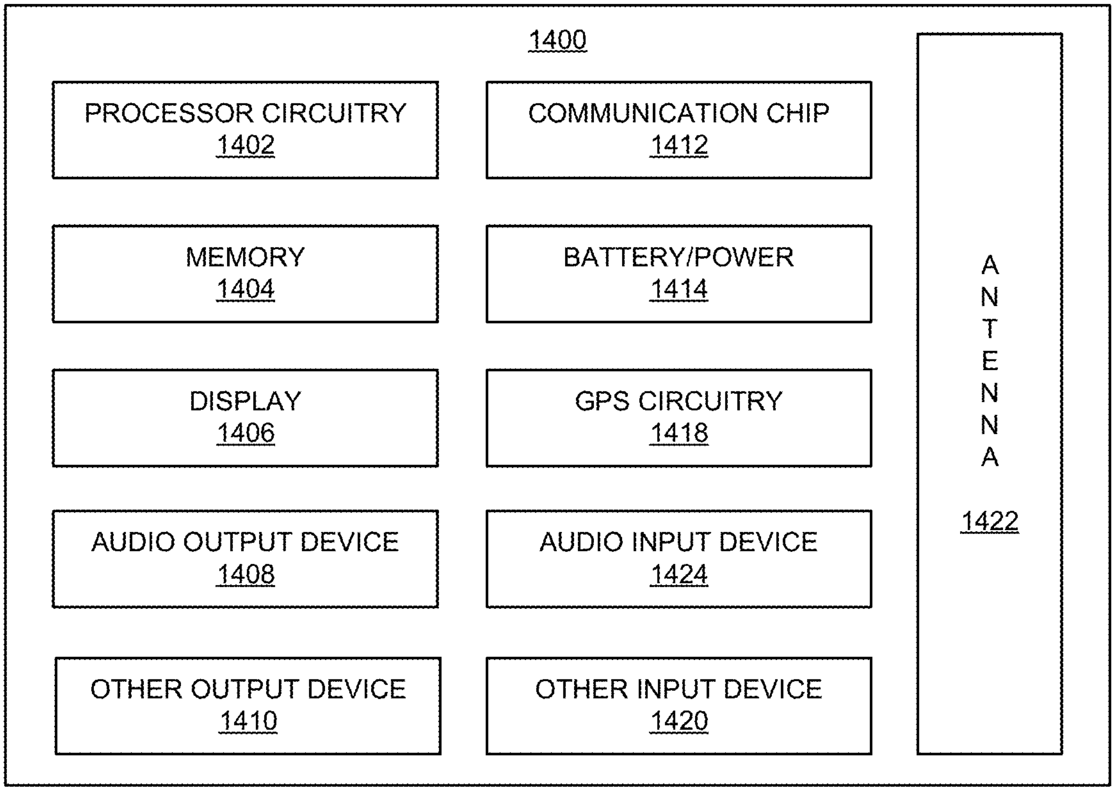
FIG. 14 is a block diagram of an example electrical device that may include an IC package constructed in accordance with teachings disclosed herein.

FIG. 14 is a block diagram of an example electrical device 1400 that may include one or more of example substrates that may connect to the example sockets 100, 350, 360, 900 disclosed herein. For example, any suitable ones of the components of the electrical device 1400 may include one or more of the device assemblies 1300, IC devices 1100, or dies 1002 disclosed herein, and may be arranged in the example substrate that may connect to the example sockets 100, 350, 360, 900. A number of components are illustrated in FIG. 14 as included in the electrical device 1400, but any one or more of these components may be omitted or duplicated, as suitable for the application. In some examples, some or all of the components included in the electrical device 1400 may be attached to one or more motherboards. In some examples, some or all of these components are fabricated onto a single system-on-a-chip (SoC) die.

Additionally, in various examples, the electrical device 1400 may not include one or more of the components illustrated in FIG. 14, but the electrical device 1400 may include interface circuitry for coupling to the one or more components. For example, the electrical device 1400 may not include a display 1406, but may include display interface circuitry (e.g., a connector and driver circuitry) to which a display 1406 may be coupled. In another set of examples, the electrical device 1400 may not include an audio input device 1424 (e.g., microphone) or an audio output device 1408 (e.g., a speaker, a headset, earbuds, etc.), but may include audio input or output device interface circuitry (e.g., connectors and supporting circuitry) to which an audio input device 1424 or audio output device 1408 may be coupled.

The electrical device 1400 may include a processor circuitry 1402 (e.g., one or more processing devices). As used herein, the term "processing device" or "processor" may refer to any device or portion of a device that processes electronic data from registers and/or memory to transform that electronic data into other electronic data that may be stored in registers and/or memory. The processor circuitry 1402 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. The electrical device 1400 may include a memory 1404, which may itself include one or more memory devices such as volatile memory (e.g., dynamic random access memory (DRAM)), nonvolatile memory (e.g., read-only memory (ROM)), flash memory, solid state memory, and/or a hard drive. In some examples, the memory 1404 may include memory that shares a die with the processor circuitry 1402. This memory may be used as cache memory and may include embedded dynamic random access memory (eDRAM) or spin transfer torque magnetic random access memory (STT-MRAM).

In some examples, the electrical device 1400 may include a communication chip 1412 (e.g., one or more communication chips). For example, the communication chip 1412 may be configured for managing wireless communications for the transfer of data to and from the electrical device 1400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some examples they might not.

The communication chip 1412 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1412 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1412 may operate in accordance with other wireless protocols in other examples. The electrical device 1400 may include an antenna 1422 to facilitate wireless communications and/or to receive other wireless communications (such as AM or FM radio transmissions).

In some examples, the communication chip 1412 may manage wired communications, such as electrical, optical, or any other suitable communication protocols (e.g., the Ethernet). As noted above, the communication chip 1412 may include multiple communication chips. For instance, a first communication chip 1412 may be dedicated to shorter-range wireless communications such as Wi-Fi or Bluetooth, and a second communication chip 1412 may be dedicated to longer-range wireless communications such as global positioning system (GPS), EDGE, GPRS, CDMA, WiMAX, LTE, EV-DO, or others. In some examples, a first communication chip 1412 may be dedicated to wireless communications, and a second communication chip 1412 may be dedicated to wired communications.

The electrical device 1400 may include battery/power circuitry 1414. The battery/power circuitry 1414 may include one or more energy storage devices (e.g., batteries or capacitors) and/or circuitry for coupling components of the electrical device 1400 to an energy source separate from the electrical device 1400 (e.g., AC line power).

The electrical device 1400 may include a display 1406 (or corresponding interface circuitry, as discussed above). The display 1406 may include any visual indicators, such as a heads-up display, a computer monitor, a projector, a touchscreen display, a liquid crystal display (LCD), a light-emitting diode display, or a flat panel display.

The electrical device 1400 may include an audio output device 1408 (or corresponding interface circuitry, as discussed above). The audio output device 1408 may include any device that generates an audible indicator, such as speakers, headsets, or earbuds.

The electrical device 1400 may include an audio input device 1424 (or corresponding interface circuitry, as discussed above). The audio input device 1424 may include any device that generates a signal representative of a sound, such as microphones, microphone arrays, or digital instruments (e.g., instruments having a musical instrument digital interface (MIDI) output).

The electrical device 1400 may include a GPS circuitry 1418. The GPS circuitry 1418 may be in communication with a satellite-based system and may receive a location of the electrical device 1400, as known in the art.

The electrical device 1400 may include any other output device 1410 (or corresponding interface circuitry, as discussed above). Examples of the other output device 1410 may include an audio codec, a video codec, a printer, a wired or wireless transmitter for providing information to other devices, or an additional storage device.

The electrical device 1400 may include any other input device 1420 (or corresponding interface circuitry, as discussed above). Examples of the other input device 1420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1400 may have any desired form factor, such as a hand-held or mobile electrical device (e.g., a cell phone, a smart phone, a mobile internet device, a music player, a tablet computer, a laptop computer, a netbook computer, an ultrabook computer, a personal digital assistant (PDA), an ultra-mobile personal computer, etc.), a desktop electrical device, a server or other networked computing component, a printer, a scanner, a monitor, a set-top box, an entertainment control unit, a vehicle control unit, a digital camera, a digital video recorder, or a wearable electrical device. In some examples, the electrical device 1400 may be any other electronic device that processes data.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that increase the resonance frequency of a socket, which increases the speed that the socket is able to transfer data. Disclosed systems, methods, apparatus, and articles of manufacture improve the efficiency of using a computing device by increasing the speed at which the socket is able to transfer data. Disclosed systems, methods, apparatus, and articles of manufacture are accordingly directed to one or more improvement(s) in the operation of a machine such as a computer or other electronic and/or mechanical device. Additionally, the example sockets disclosed herein provide a cost-effective approach that can expand the socket bandwidth by at least 35% without changing the design of the contacts (e.g., pins, interconnects, conductive contacts). The techniques disclosed herein remove the requirement to have more ground pins which limits pin count growth and causes minimum impact to the existing CPU loading solution.

Example methods, apparatus, systems, and articles of manufacture to extend socket electrical bandwidth through ground structure enhancement are disclosed herein.

Example 1 includes an apparatus including a housing defining a plurality of first openings and a plurality of second openings, a ground structure coupled to the housing, the ground structure defining a plurality of third openings, the third openings of the ground structure to align with the second openings of the housing when the ground structure is coupled to the housing, a plurality of ground pins located in respective ones of the second openings and third openings, the ground structure to electrically couple different ones of the ground pins, and a plurality of signal pins located in respective ones of the first openings of the housing, the signal pins electrically isolated from the ground structure.

Example 2 includes the apparatus of example 1, wherein the ground structure is to electrically bifurcate the ground pins into an upper portion of the ground pins and a lower portion of the ground pins without decreasing a physical overall length of the ground pins.

Example 3 includes the apparatus of example 1, wherein the ground structure engages the ground pins at a point between opposite ends of the ground pins.

Example 4 includes the apparatus of example 3, wherein the ground structure engages the ground pins at a midpoint between two equal portions.

Example 5 includes the apparatus of example 1, wherein the ground structure is embedded between a first surface of the housing and a second surface of the housing opposite the first surface.

Example 6 includes the apparatus of example 1, wherein the ground structure includes a first portion and a second portion, the first portion of the ground structure associated with a first group of the ground pins and a first pair of the signal pins, the second portion of the ground structure associated with a second group of the ground pins and a second pair of the signal pins.

Example 7 includes the apparatus of example 6, wherein the first portion of the ground structure is electrically decoupled from the second portion of the ground structure.

Example 8 includes the apparatus of example 7, wherein the first group of ground pins are electrically coupled via the first portion of the ground structure and the second group of ground pins are electrically coupled via the second portion of the ground structure.

Example 9 includes a socket including a housing having a plurality of first ground openings and signal openings, and a ground structure coupled to the housing, the ground structure including a plurality of second ground openings, the first ground openings to align with respective ones of the second ground openings when the ground structure is coupled to the housing.

Example 10 includes the socket of example 9, further including a plurality of ground pins positioned in respective ones of the first ground openings and the second ground openings.

Example 11 includes the socket of example 10 wherein the ground structure is to electrically couple the ground pins.

Example 12 includes the socket of example 10, further including a plurality of signal pins located in respective ones of the signal openings of the housing.

Example 13 includes the socket of example 12, wherein the signal pins are electrically isolated from the ground structure.

Example 14 includes the socket of example 13, wherein the ground pins surround the signal pins to reduce crosstalk interference between the signal pins.

Example 15 includes the socket of example 9, wherein the ground structure is made of an electrically conductive material and the housing is made of an electrically insulating material.

Example 16 includes the socket of example 15, wherein the ground structure is positioned between respective ends of the ground pins.

Example 17 includes a method including providing a ground structure for a socket, fabricating a housing for the socket to support the ground structure, and inserting ground pins into the ground structure, the ground structure to engage a body of the ground pins to electrically couple the ground pins.

Example 18 includes the method of example 17, wherein fabricating the housing includes overmolding the housing and the ground structure via injection molding.

Example 19 includes the method of example 17, wherein fabricating the housing includes an injection-molding process prior to coupling the housing to the ground structure.

Example 20 includes the method of example 19, further including attaching the ground structure and the housing via a press-fit manufacturing process.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:

a housing defining a plurality of first openings and a plurality of second openings;

a ground structure coupled to the housing, the ground structure defining a plurality of third openings, the third openings of the ground structure to align with the second openings of the housing when the ground structure is coupled to the housing;

a plurality of ground pins in respective ones of the second openings and third openings, the ground structure to electrically couple different ones of the ground pins, the ground structure engages the ground pins at a point between opposite ends of the ground pins; and a plurality of signal pins in respective ones of the first openings of the housing, the signal pins electrically isolated from the ground structure.

2. The apparatus of claim 1, wherein the ground structure is to electrically bifurcate the ground pins into an upper portion of the ground pins and a lower portion of the ground pins without decreasing a physical overall length of the ground pins.

3. The apparatus of claim 1, wherein the ground structure engages the ground pins at a midpoint between two equal portions.

4. The apparatus of claim 1, wherein the ground structure is embedded between a first surface of the housing and a second surface of the housing opposite the first surface.

5. The apparatus of claim 1, wherein the ground structure includes a first portion and a second portion, the first portion of the ground structure associated with a first group of the ground pins and a first pair of the signal pins, the second portion of the ground structure associated with a second group of the ground pins and a second pair of the signal pins.

6. The apparatus of claim 5, wherein the first portion of the ground structure is electrically decoupled from the second portion of the ground structure.

7. The apparatus of claim 6, wherein the first group of ground pins are electrically coupled via the first portion of the ground structure and the second group of ground pins are electrically coupled via the second portion of the ground structure.

8. A socket comprising:

a housing having a plurality of first ground openings and signal openings, a first portion of the housing extending around the signal openings; and a ground structure coupled to the housing, the ground structure including a plurality of second ground openings, the first ground openings to align with respective ones of the second ground openings when the ground structure is coupled to the housing, the ground structure extending around the first portion of the housing.

9. The socket of claim 8, including a plurality of ground pins in respective ones of the first ground openings and the second ground openings.

10. The socket of claim 9, wherein the ground structure is to electrically couple the ground pins.

11. The socket of claim 9, including a plurality of signal pins in respective ones of the signal openings of the housing.

12. The socket of claim 11, wherein the signal pins are electrically isolated from the ground structure.

13. The socket of claim 12, wherein the ground pins surround the signal pins to reduce crosstalk interference between the signal pins.

14. The socket of claim 8, wherein the ground structure includes an electrically conductive material and the housing includes an electrically insulating material.

15. The socket of claim 9, wherein the ground structure is between respective ends of the ground pins.

16. The socket of claim 8, wherein a second portion of the housing extends around the ground structure in a same plane that the ground structure extends around the first portion of the housing.

17. A method comprising:

providing a ground structure for a socket;

fabricating a housing for the socket to support the ground structure; and inserting ground pins through the ground structure, opposing first and second ends of the ground pins to protrude beyond respective first and second sides of the ground structure, the ground structure to engage a body of the ground pins to electrically couple the ground pins.

18. The method of claim 17, wherein the fabricating of the housing includes overmolding the housing and the ground structure via injection molding.

19. The method of claim 17, wherein the fabricating of the housing includes an injection-molding process prior to coupling the housing to the ground structure.

20. The method of claim 19, further-including attaching the ground structure and the housing via a press-fit manufacturing process.

* * * * *